(12) United States Patent
Tajima

(10) Patent No.: US 8,748,839 B2
(45) Date of Patent: Jun. 10, 2014

(54) RADIATION IMAGE CAPTURING SYSTEM AND RADIATION IMAGE CAPTURING APPARATUS

(75) Inventor: Hideaki Tajima, Hachioji (JP)

(73) Assignee: Konica Minolta Medical & Graphic, Inc. (JP)

( * ) Notice: Subject to any disclaimer, the term of this patent is extended or adjusted under 35 U.S.C. 154(b) by 0 days.

(21) Appl. No.: 13/617,951

(22) Filed: Sep. 14, 2012

(65) Prior Publication Data

US 2013/0082186 A1    Apr. 4, 2013

(30) Foreign Application Priority Data

Oct. 3, 2011 (JP) ................................. 2011-218892

(51) Int. Cl.
G01J 1/42 (2006.01)
(52) U.S. Cl.
USPC ........................................................ 250/394
(58) Field of Classification Search
USPC ................ 250/394, 370.01–370.15; 378/98.8
See application file for complete search history.

(56) References Cited

U.S. PATENT DOCUMENTS

| | | | |
|---|---|---|---|
| 7,211,803 B1 | 5/2007 | Dhurjaty et al. | |
| 7,822,179 B2 * | 10/2010 | Tsuji | 378/98.8 |
| 8,130,909 B2 * | 3/2012 | Nishino et al. | 378/91 |

FOREIGN PATENT DOCUMENTS

| | | |
|---|---|---|
| JP | 9325059 A1 | 12/1993 |
| JP | 6-342099 A | 12/1994 |
| JP | 7-72252 A | 3/1995 |
| JP | 7-506993 A | 8/1995 |
| JP | 9-73144 A | 3/1997 |
| JP | 9-107503 A | 4/1997 |
| JP | 9-140691 A | 6/1997 |
| JP | 09-197051 A | 7/1997 |
| JP | 9-197051 A | 7/1997 |
| JP | 11-155847 A | 6/1999 |
| JP | 2003-126072 A | 5/2003 |
| JP | 2004-344249 A | 12/2004 |
| JP | 2006-58124 A | 3/2006 |
| JP | 2007-151761 A | 6/2007 |
| JP | 2008-000595 A | 1/2008 |
| JP | 2008-132216 A | 12/2008 |
| JP | 2009-153984 A | 7/2009 |
| JP | 2009-219538 A | 10/2009 |
| WO | 2009005119 A1 | 1/2009 |

* cited by examiner

Primary Examiner — Kiho Kim
(74) Attorney, Agent, or Firm — Cantor Colburn LLP

(57) ABSTRACT

A radiation image capturing system which includes a radiation image capturing apparatus including a detection part, a scan activation unit, switch units, a reading circuit, a control unit and a communication unit, a radiation generation apparatus and a console wherein the radiation image capturing apparatus switches an image capturing method between a cooperation method in which radiation image capturing is performed in cooperation with the radiation generation apparatus and a non-cooperation method in which radiation image capturing is performed without cooperation with the radiation generation apparatus, and the console switches standby time which is a time period after the radiation image capturing apparatus becomes able to perform radiation image capturing until the radiation source is allowed to emit radiation onto the radiation image capturing apparatus between the cooperation method and the non-cooperation method.

16 Claims, 26 Drawing Sheets

FIG. 9
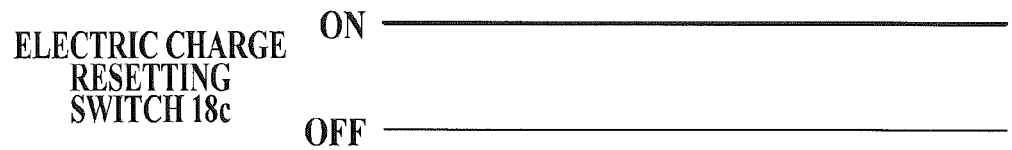
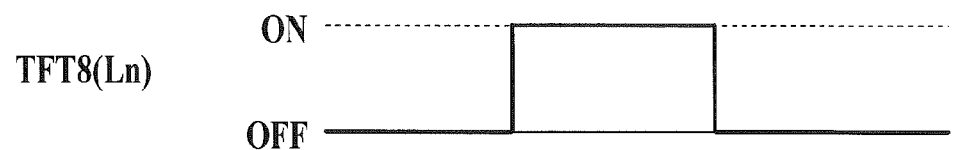
FIG. 10
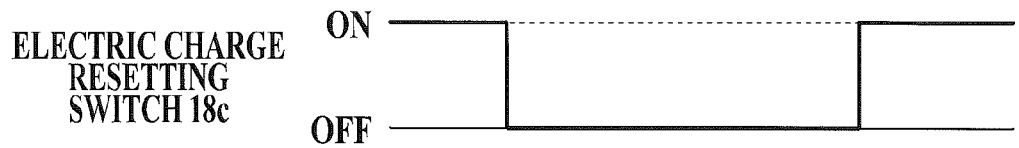
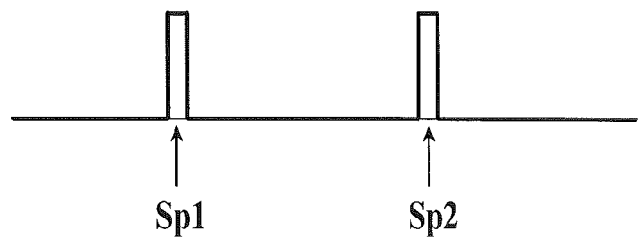
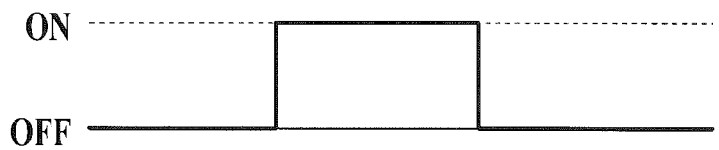

FIG. 25

| | | | | | | |
|---|---|---|---|---|---|---|
| L1 | D(1,1) | D(1,2) | D(1,3) | D(1,4) | D(1,5) | |
| L2 | D(2,1) | D(2,2) | D(2,3) | D(2,4) | D(2,5) | |
| L3 | D(3,1) | D(3,2) | D(3,3) | D(3,4) | D(3,5) | |
| L4 | D(4,1) | D(4,2) | D(4,3) | D(4,4) | D(4,5) | |
| L5 | D(5,1) | D(5,2) | D(5,3) | D(5,4) | D(5,5) | |
| L6 | D(6,1) | D(6,2) | D(6,3) | D(6,4) | D(6,5) | |
| L7 | D(7,1) | D(7,2) | D(7,3) | D(7,4) | D(7,5) | |
| L8 | D(8,1) | D(8,2) | D(8,3) | D(8,4) | D(8,5) | |
| L9 | D(9,1) | D(9,2) | D(9,3) | D(9,4) | D(9,5) | |
| L10 | D(10,1) | D(10,2) | D(10,3) | D(10,4) | D(10,5) | |
| L11 | D(11,1) | D(11,2) | D(11,3) | D(11,4) | D(11,5) | |
| L12 | D(12,1) | D(12,2) | D(12,3) | D(12,4) | D(12,5) | |

RADIATION IMAGE CAPTURING SYSTEM AND RADIATION IMAGE CAPTURING APPARATUS

BACKGROUND OF THE INVENTION

1. Field of the Invention

The present invention relates to a radiation image capturing system and a radiation image capturing apparatus.

2. Description of Related Art

There has been developed various types of so-called direct-type radiation image capturing apparatuses and so-called indirect-type radiation image capturing apparatuses. The direct-type radiation image capturing apparatus is a type that generates electric charges by detection elements according to the radiation exposure dose such as x-ray and converts the generated electric charges to electric signals. The indirect-type radiation image capturing apparatus is a type that converts the irradiated radiation to electromagnetic waves of other wavelength such as visible light by a scintillator or the like, and thereafter, generates electric charges by photoelectric conversion elements such as photodiodes according to the energy of the electromagnetic waves which are converted and irradiated and converts the generated electric charges to electric signals (that is, image data). In the present invention, the detection elements in the direct-type radiation image capturing apparatus and the photoelectric conversion elements in the indirect-type radiation image capturing apparatus are called radiation detection elements all together.

Such types of radiation image capturing apparatuses are known as FPD (Flat Panel Detector), and conventionally, they are configured as so-called exclusive type in which an image capturing apparatus is integrally formed with a support platform (for example, see Japanese Patent Laid-Open Publication No. H9-73144). However, in recent years, a portable radiation image capturing apparatus which is made to be portable by placing the radiation detection elements and the like in a housing is developed and is being put to practical use (for example, see Japanese Patent Laid-Open Publication No. 2006-058124 and Japanese Patent Laid-Open Publication No. H6-342099).

Such radiation image capturing apparatus is usually configured so that a plurality of radiation detection elements 7 are two dimensionally arranged (matrix form) on a detection part P and each of the radiation detection elements 7 is connected to a switch unit formed of a Thin Film Transistor (hereinafter, called TFT) 8, as shown in the after-mentioned FIG. 7 and others, for example.

Then, in radiation image capturing, a radiation source of a radiation generation apparatus emits radiation onto the radiation image capturing apparatus via the target body. The electric charges accumulated in the radiation detection elements 7 by the radiation irradiation are released to signal lines 6 sequentially and converted into image data to be read out.

In conventional radiation image capturing apparatuses, as after-mentioned, ON voltage is applied to scanning lines 5 sequentially and reset processing is performed on each of the radiation detection elements 7 before radiation image capturing is performed (see after-mentioned FIG. 13). Then, when an exposure switch 56 of the radiation generation apparatus 55 (see after-mentioned FIGS. 11 and 12) is operated by a radiation technologist to perform radiation irradiation, as shown in after-mentioned FIG. 14, a radiation irradiation start signal is sent from the radiation generation apparatus 55 to the radiation image capturing apparatus.

At the time when the radiation image capturing apparatus ends the reset processing Rm for one frame, the radiation image capturing apparatus switches to an electric charge accumulating state and sends an interlock release signal to the radiation generation apparatus 55. Then, the radiation generation apparatus 55 emits radiation from the radiation source 52 only after receiving the interlock release signal. In many cases, radiation image capturing has been performed in such way.

The flow of these processing will be described in detail below. Also, hereinafter, the method of performing radiation image capturing by exchanging signals between the radiation image capturing apparatus and the radiation generation apparatus and by the radiation image capturing apparatus and the radiation generation apparatus cooperating with each other in such way will be called the cooperation method.

Incidentally, when manufacturers are different between the radiation image capturing apparatus and the radiation generation apparatus, it is not necessarily easy to configure so as to establish interface therebetween and to perform radiation image capturing in cooperation with each other by exchanging signals and such like as described above.

Therefore, in such case, it is necessary to configure so that the radiation image capturing apparatus detects start of radiation irradiation by itself to perform radiation image capturing. Hereinafter, the method of performing radiation image capturing in a state where the radiation image capturing apparatus and the radiation generation apparatus cannot cooperate (or do not cooperate) with each other in such way will be called the non-cooperation method.

After many studies, the inventors of the present invention were able to develop several new detection techniques by which a radiation image capturing apparatus can accurately detect the start of radiation irradiation by itself. It is known that radiation image capturing can be performed accurately even in the non-cooperation method in which signals or such like cannot be exchanged between the radiation image capturing apparatus and the radiation generation apparatus if such new detection techniques are used.

However, on the other hand, for example, it has been known that preferred radiation images cannot be necessarily obtained if the parameter which is set in the radiation image capturing apparatus in a case where radiation image capturing is performed in the conventional cooperation method is applied as it is to a case where such new detection technique is adopted.

When the radiation image capturing apparatus is configured so as to perform radiation image capturing in both of the cooperation method and the non-cooperation method, the negative effect as described above can occur if the parameter in the cooperation method is applied when radiation image capturing is performed in the non-cooperation method. However, on the contrary, if the parameter is changed so as to be appropriate for the non-cooperation method, there can be a negative effect such that the radiation image capturing apparatus and the radiation image capturing system cannot be conveniently used by a radiation technologist, for example, when radiation image capturing is to be performed next in the cooperation method.

For example, in order to reduce electric power consumption in the radiation image capturing apparatus, the configuration may be such that the power consumption mode of the radiation image capturing apparatus can be switched between the image capturing mode in which radiation image capturing can be performed by supplying power to a scan activation unit 15 and each reading circuit 17 (see after-mentioned FIG. 7), by applying reverse bias voltage from a bias power source 14 to each radiation detection element 7 or such like and a sleep mode in which these power supply is stopped and power is supplied only to the necessary function parts such as an antenna device 41. Here, in the sleep mode, the radiation image capturing cannot be performed.

In such case, when the power consumption mode of the radiation image capturing apparatus is switched from the sleep mode to the image capturing mode, as mentioned below, usually, radiation image capturing cannot be carried out immediately after the switching, and the radiation source 52 is allowed to emit radiation onto the radiation image capturing apparatus only after the radiation image capturing apparatus is put on standby for a predetermined time period.

Such elapsed time until the radiation source 52 is allowed to actually emit radiation onto the radiation image capturing apparatus after it becomes possible for the radiation image capturing apparatus to perform radiation image capturing by switching the power consumption mode thereof from the sleep mode to the image capturing mode, by turning on the radiation image capturing apparatus or such like will be called standby time hereinafter.

Standby time for the case where radiation image capturing is performed in the cooperation method may be set in the radiation image capturing apparatus. However, in a case where radiation image capturing is performed in the non-cooperation method, when the radiation image capturing apparatus is put on standby only for the above standby time before carrying out radiation image capturing, drastic difference in brightness may appear in the radiation image as mentioned later.

On the other hand, when the standby time is set so as not to cause the drastic difference in brightness as described above in the case of the non-cooperation method, there is a problem such that when radiation image capturing is carried out in the cooperation method next, the radiation image capturing apparatus and the radiation image capturing system cannot be conveniently used by a radiation technologist because the radiation image capturing apparatus need to be on standby longer than needed.

SUMMARY OF THE INVENTION

The present invention was made in consideration of the above problems and an object of the present invention is to provide a radiation image capturing system and a radiation image capturing apparatus which can accurately prevent drastic difference in brightness in radiation images and which can be conveniently used by a radiation technologist in a configuration where radiation image capturing can be performed in both a cooperation method and a non-cooperation method by using the radiation image capturing apparatus.

In order to solve the above problems, according to one aspect of the present invention, there is provided a radiation image capturing system, including a radiation image capturing apparatus, including a detection part including a plurality of scanning lines and a plurality of signal lines which are disposed so as to intersect each other and a plurality of radiation detection elements which are two dimensionally arranged by providing each of the radiation detection elements in each of small regions defined by the plurality of scanning lines and the plurality of signal lines; a scan activation unit which switches voltage to be applied to each of the scanning lines between ON voltage and OFF voltage; switch units which are respectively connected to the scanning lines and release electric charges accumulated in the radiation detection elements to the signal lines when ON voltage is applied; a reading circuit in which the electric charges released from the radiation detection elements are converted into image data and read out; a control unit which controls at least the scan activation unit and the reading circuit to perform reading processing of the image data from the radiation detection elements; and a communication unit for performing sending and receiving of signals and sending of the image data to an external apparatus; a radiation generation apparatus including a radiation source which emits radiation onto the radiation image capturing apparatus; and a console which communicates with the radiation image capturing apparatus; wherein the radiation image capturing apparatus switches an image capturing method between a cooperation method in which radiation image capturing is performed in cooperation with the radiation generation apparatus and a non-cooperation method in which radiation image capturing is performed without cooperation with the radiation generation apparatus, and the console switches standby time which is a time period after the radiation image capturing apparatus becomes able to perform radiation image capturing until the radiation source is allowed to emit radiation onto the radiation image capturing apparatus between the cooperation method and the non-cooperation method.

Preferably, in the radiation image capturing system, when the radiation image capturing is to be performed in the non-cooperation method, before the radiation image capturing is performed, the control unit of the radiation image capturing apparatus performs reading processing of leak data in which the electric charges leaked from each of the radiation detection elements via each of the switch units in a state where each of the switch units is turned off by applying OFF voltage from the scan activation unit to each of the scanning lines are converted into leak data, and detects that radiation irradiation is started when the read out leak data exceeds a threshold value.

Preferably, in the radiation image capturing system, when the radiation image capturing is performed in the non-cooperation method, before the radiation image capturing is performed, the control unit of the radiation image capturing apparatus performs reading processing of image data for detecting radiation irradiation start by applying ON voltage from the scan activation unit to each of the scanning lines sequentially, and detects that radiation irradiation is started when the read out image data for detecting the radiation irradiation start exceeds a threshold value.

Preferably, in the radiation image capturing system, each of the standby time in the cooperation method and the standby time in the non-cooperation method is set as a fixed time.

Preferably, in the radiation image capturing system, the control unit of the radiation image capturing apparatus analyzes a value of the leak data or a value of the image data for detecting the radiation irradiation start which are read out, and changes the standby time at least in a case of the non-cooperation method.

Preferably, in the radiation image capturing system, the control unit of the radiation image capturing apparatus sends the changed standby time to the console to notify when the standby time is changed.

Preferably, in the radiation image capturing system, the radiation image capturing apparatus switches a power consumption mode between an image capturing mode in which electric power is supplied at least to the scan activation unit and the reading circuit and radiation image capturing is to be performed and a sleep mode in which electric power is supplied only to a necessary function part and radiation image capturing is not performed, and the standby time is set as a time period after the power consumption mode of the radiation image capturing apparatus is switched from the sleep mode to the image capturing mode until the radiation source is allowed to emit the radiation onto the radiation image capturing apparatus.

Preferably, in the radiation image capturing system, the console switches the power consumption mode of the radiation image capturing apparatus at least from the sleep mode to the image capturing mode.

Preferably, in the radiation image capturing system, the standby time is set as a time period after the radiation image capturing apparatus is turned on until the radiation source is allowed to emit the radiation onto the radiation image capturing apparatus.

Preferably, the radiation image capturing system further includes a plurality of the radiation image capturing apparatuses and the standby time is set for each of the radiation image capturing apparatuses.

Preferably, in the radiation image capturing system, the console includes a display part and displays a warning not to perform radiation irradiation on the display part after the radiation image capturing apparatus becomes able to perform the radiation image capturing until the standby time elapses.

Preferably, in the radiation image capturing system, the console includes a display part and, when the radiation source emits the radiation onto the radiation image capturing apparatus during the standby time, displays a warning indicating a possibility of worsening in image quality when an image generated based on data sent from the radiation image capturing apparatus is displayed on the display part.

In addition, according to another aspect of the preferred embodiment of the present invention, there is provided a radiation image capturing apparatus, including a detection part comprising a plurality of scanning lines and a plurality of signal lines which are disposed so as to intersect each other and a plurality of radiation detection elements which are two dimensionally arranged by providing each of the radiation detection elements in each of small regions defined by the plurality of scanning lines and the plurality of signal lines; a scan activation unit which switches voltage to be applied to each of the scanning lines between ON voltage and OFF voltage; switch units which are respectively connected to the scanning lines and release electric charges accumulated in the radiation detection elements to the signal lines when ON voltage is applied; a reading circuit in which the electric charges released from the radiation detection elements are converted into image data and read out; a control unit which controls at least the scan activation unit and the reading circuit to perform reading processing of the image data from the radiation detection elements; and a communication unit for performing sending and receiving of signals and sending of the image data to a console; and the control unit analyzes a value of leak data or a value of image data for detecting radiation irradiation start which are read out, and sends a signal for allowing radiation irradiation to the console when a derivative value of the leak data or a derivative value of the image data for detecting radiation irradiation start becomes equal to or less than a predetermined threshold value.

Preferably, in the radiation image capturing apparatus, the control unit performs display for allowing radiation irradiation on a display unit of the apparatus instead of or in parallel with sending a signal for allowing radiation irradiation to the console.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 9 is a timing chart showing a timing of ON/OFF of an electric charge resetting switch and a TFT in reset processing of each radiation detection element;

FIG. 10 is a timing chart showing a timing of ON/OFF of an electric charge resetting switch, pulse signal and a TFT in image data reading processing;

FIG. 11 is a diagram illustrating a configuration example of a radiation image capturing system according to the embodiment which is established in a radiation image capturing room or the like;

FIG. 25 is a diagram explaining an example of how to extract thinned data from image data;

DETAILED DESCRIPTION OF THE PREFERRED EMBODIMENT

Hereinafter, an embodiment of a radiation image capturing system and a radiation image capturing apparatus according to the present invention will be described with reference to drawings.

Hereinafter, a so-called indirect-type radiation image capturing apparatus which includes a scintillator or the like and converts the irradiated radiation into electromagnetic waves of other wavelength such as visible light to obtain electric signals will be described as the radiation image capturing apparatus. However, the present invention can also be applied to a so-called direct-type radiation image capturing apparatus which directly detects radiation by radiation detection elements without a scintillator or the like.

In addition, the present invention can be applied to not only a so-called portable radiation image capturing apparatus described in the embodiment, but can be also applied to an exclusive type radiation image capturing apparatus which is integrally formed with a support platform and the like, for example.

[Radiation Image Capturing Apparatus]

Figure 1:
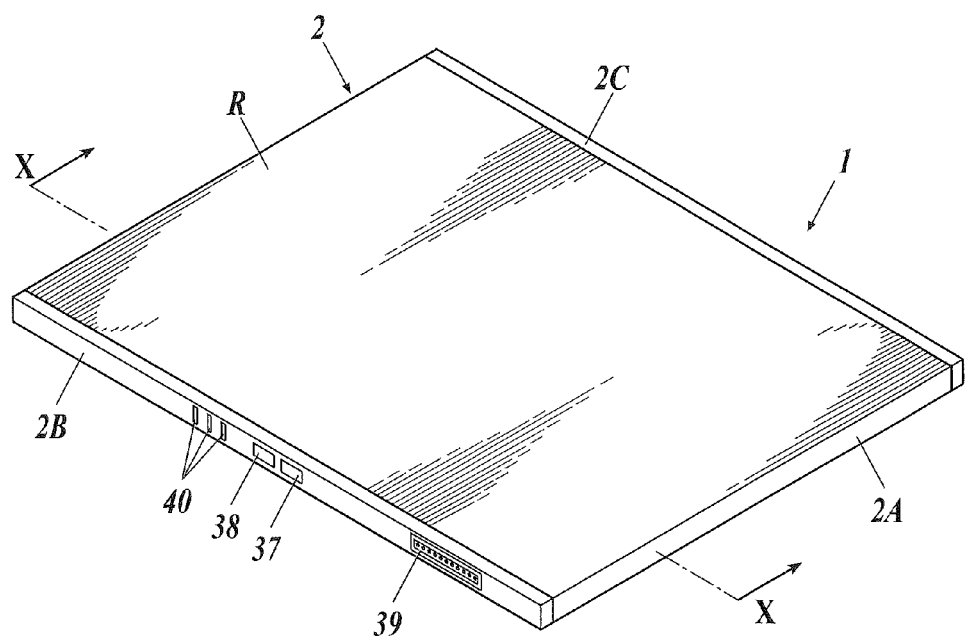
FIG. 1 is a schematic diagram illustrating an outer appearance of a radiation image capturing apparatus according to the embodiment.
Figure 2:
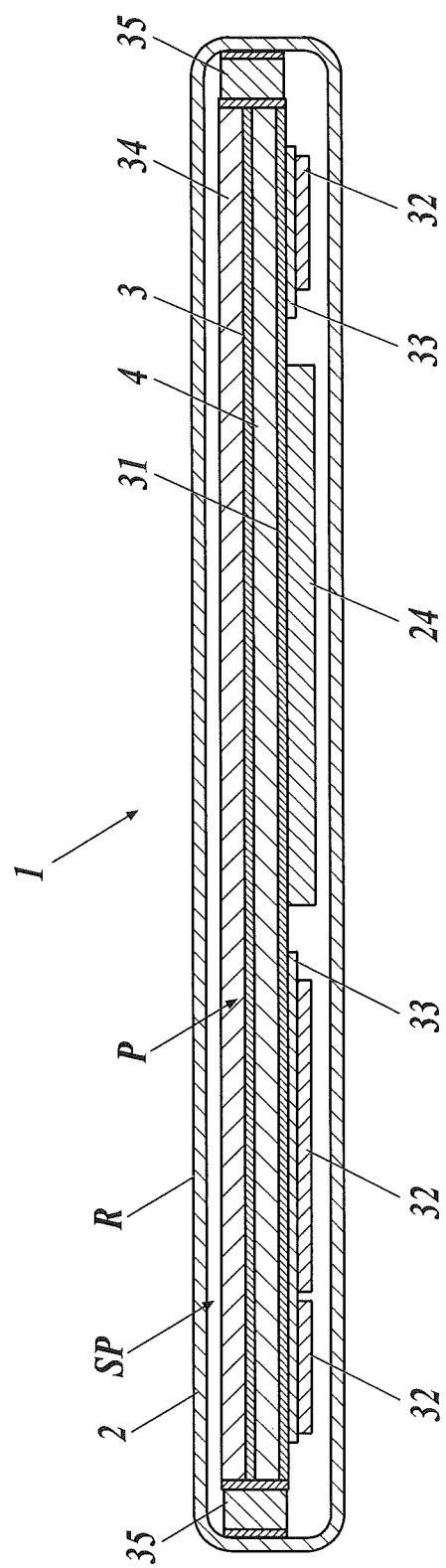
FIG. 2 is a sectional diagram when cut along the line X-X in FIG. 1.

FIG. 1 is a schematic diagram illustrating an outer appearance of a radiation image capturing apparatus according to the embodiment and FIG. 2 is a sectional diagram when cut along the line X-X in FIG. 1. In the radiation image capturing apparatus 1, as shown in FIGS. 1 and 2, a sensor panel SP which includes a scintillator 3, a substrate 4 and the like is housed in a housing 2.

In the embodiment, in the housing 2, a housing main body part 2A which is hollow and in a rectangular tube including a radiation incidence surface R is formed of a material such as a carbon plate or plastic which transmits radiation, and the housing 2 is formed by covering the opening parts at both sides of the housing main body part 2A with lid members 2B and 2C. Also, on the lid member 2B at one side of the housing 2, a power switch 37, an alternation switch 38, a connector 39, indicators 40 including LED or the like which display a battery condition and an operating state of the radiation image capturing apparatus 1, and the like are disposed.

Figure 3:
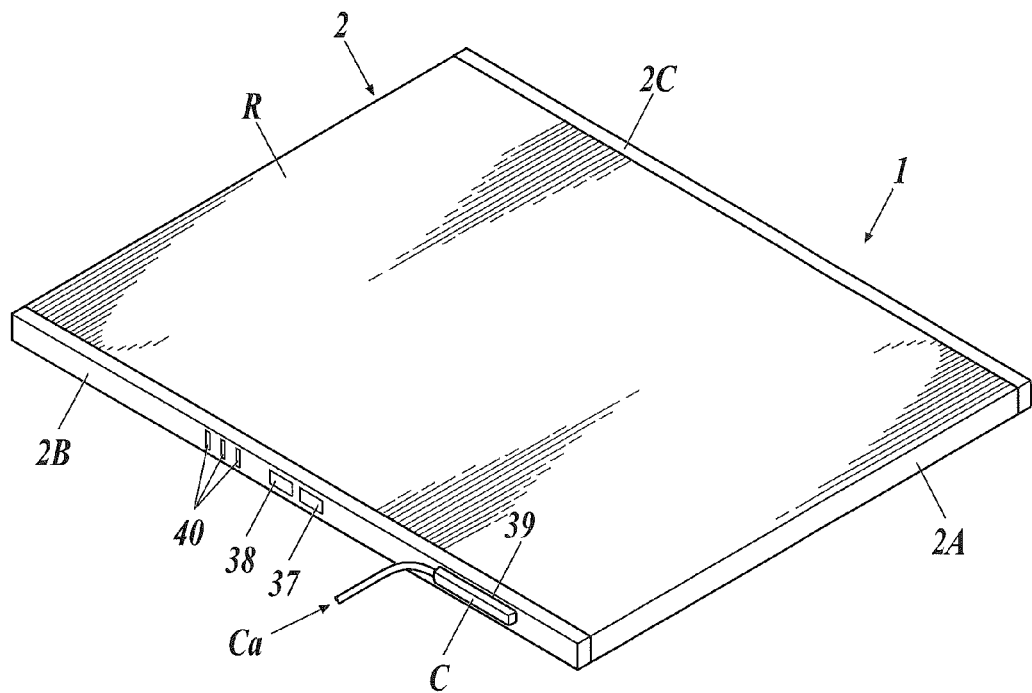
FIG. 3 is a schematic diagram illustrating a state where a connector of a cable is connected to a connector of the radiation image capturing apparatus.

In the embodiment, as shown in FIG. 3 for example, by connecting a connector C provided at the end of the cable Ca to the connector 39, the connector 39 functions as a communication unit of a wired system when signals are sent and received and image data D is sent via the cable Ca between an apparatus such as an external console 58 (see after-mentioned FIGS. 11 and 12) and the radiation image capturing apparatus.

Also, though not shown in the drawings, an antenna device 41 (see after-mentioned FIG. 7) is provided on the lid member 2C and the like at the other side of the housing 2 by being embedded in the lid member 2C, for example. In the embodiment, the antenna device 41 functions as a communication unit when signals and the like are sent and received in a wireless system between the radiation image capturing apparatus 1 and the console 58 and the like.

As shown in FIG. 2, in the housing 2, a platform 31 is disposed below the substrate 4 via a thin plate of lead and the like (not shown in the drawings), and on the platform 31, a PCB board 33 on which electronic components 32 and the like are disposed and a battery 24 are attached, for example. In addition, on the radiation incidence surface R of the substrate 4 and the scintillator 3, a glass substrate 34 for protecting them is disposed. Also, in the embodiment, a cushioning member 35 is provided between the sensor panel SP and each of the sides of the housing 2.

The scintillator 3 is provided in a position on the substrate 4 that faces the after-mentioned detection part P. In the embodiment, as the scintillator 3, for example, a scintillator in which fluorescent material is the main component and which converts radiation into electromagnetic waves of 300 to 800 nm wavelength, that is, electromagnetic waves centering on visible light and outputs the electromagnetic waves upon receiving of radiation is used.

Figure 4:
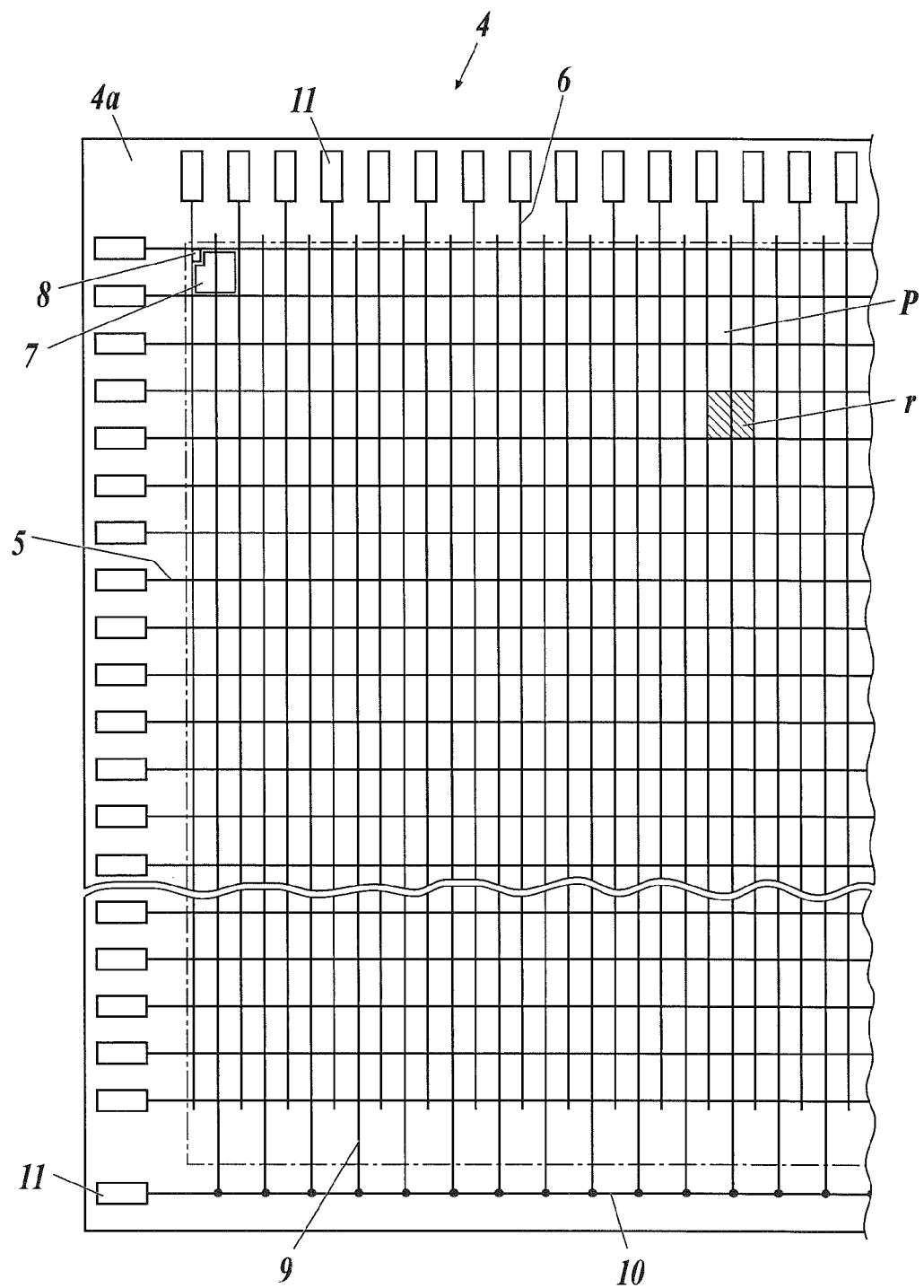
FIG. 4 is a plan view illustrating a configuration of a substrate of the radiation image capturing apparatus.

Also, in the embodiment, the substrate 4 includes a glass board, and as shown in FIG. 4, a plurality of scanning lines 5 and a plurality of signal lines 6 are arranged so as to intersect each other on the surface 4a of the substrate 4 that faces the scintillator 3. Further, radiation detection element 7 is provided in each of the small regions r which are defined by the plurality of scanning lines 5 and the plurality of signal lines 6 on the surface 4a of the substrate 4.

The region including the entire small regions r in which a plurality of radiation detection elements 7 are two dimensionally arranged in respective small regions r defined by the scanning lines 5 and the signal lines 6, that is the region indicated by dashed lines in FIG. 4, is the detection part P.

When radiation enters from the radiation incidence surface R of the housing 2 in the radiation image capturing apparatus 1 and the radiation detection elements 7 are irradiated with electromagnetic waves such as visible light converted from the radiation in the scintillator 3, the electron-hole pairs are generated inside the radiation detection elements 7. In such way, the radiation detection elements 7 convert the irradiated radiation (in the embodiment, electromagnetic waves converted from radiation in the scintillator 3) into electric charges.

Figure 5:
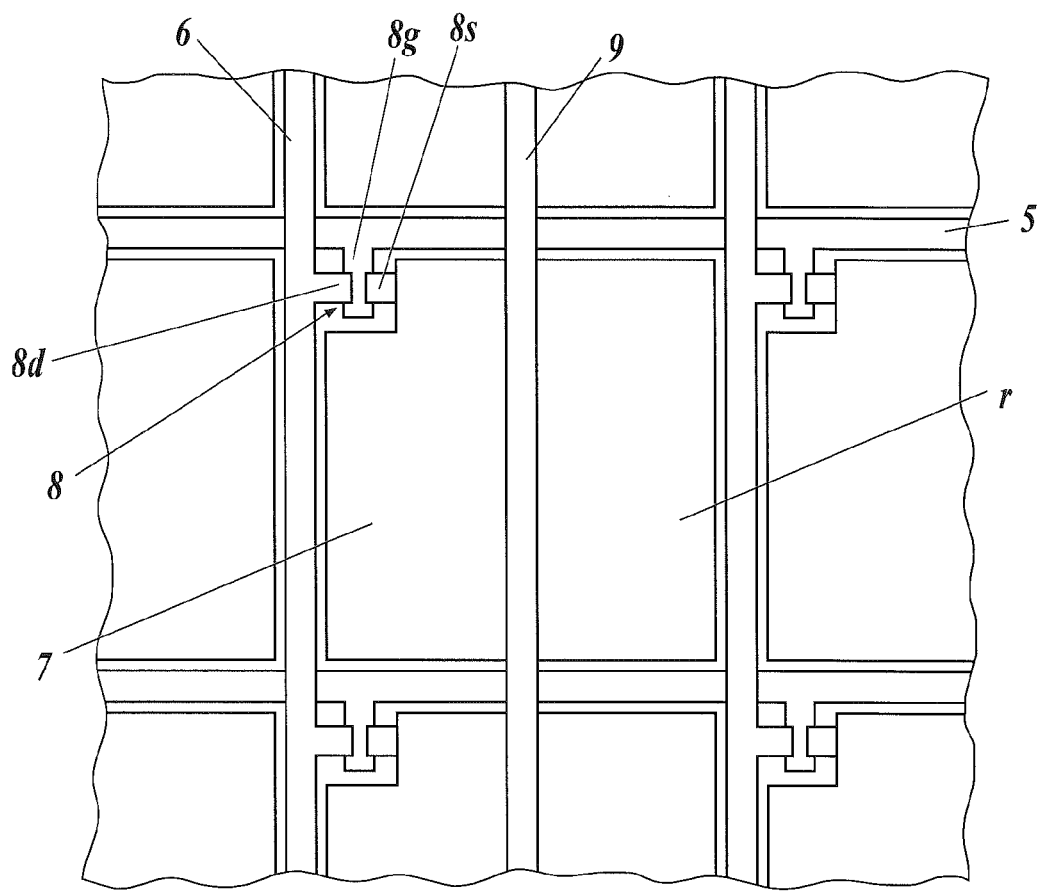
FIG. 5 is an enlarged view illustrating a configuration of radiation detection elements, TFTs and such like which are formed in small regions on the substrate of FIG. 4.

In the embodiment, photodiodes are used as the radiation detection elements 7. However, phototransistors or the like can also be used, for example. As shown in FIG. 5 which is the enlarged view of FIG. 4, each radiation detection element 7 is connected to a source electrode 8s of the TFT 8 which is a switch unit. Further, a drain electrode 8d of the TFT 8 is connected to the signal line 6.

When ON voltage is applied to the gate electrode 8g of the TFT 8 from the after-mentioned scan activation circuit 15 via the scanning line 5, the TFT 8 is turned on, and electric charges accumulated in the radiation detection element 7 are released to the signal line 6 via the source electrode 8s and the drain electrode 8d. Further, when OFF voltage is applied to the gate electrode 8g via the scanning line 5 connected thereto, the TFT 8 is turned off and stops the releasing of electric charges from the radiation detection element 7 to the signal line 6 so as to accumulate electric charges in the radiation detection element 7.

In the embodiment, as shown in FIG. 5, one bias line 9 is connected to the plurality of radiation detection elements 7 which are disposed in an array, and the bias lines 9 are disposed in parallel with the signal lines 6 as shown in FIG. 4. Further, each of the bias lines 9 is tied to a connection line 10 at the position outside of the detection part P of the substrate 4.

Figure 6:
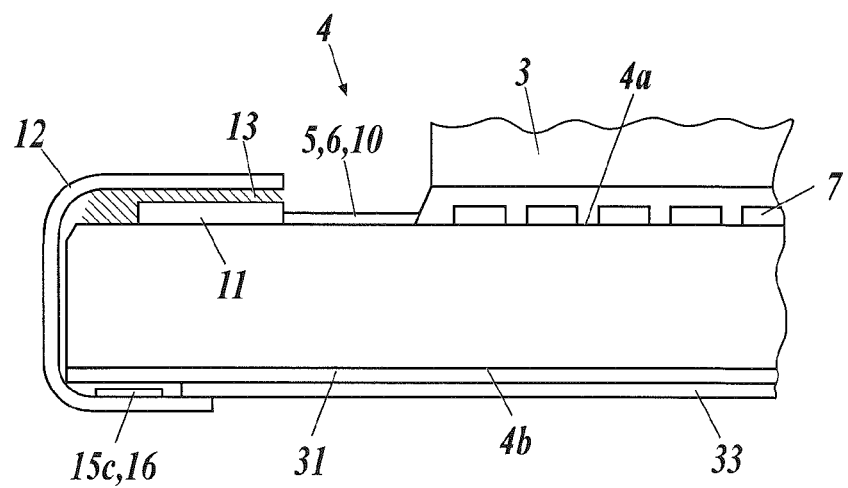
FIG. 6 is a side view explaining a substrate to which flexible circuit boards, PCB boards and the like are attached.

As shown in FIG. 4, in the embodiment, the scanning lines 5, the signal lines 6 and the connection line 10 of the bias lines 9 are respectively connected to input/output terminals 11 (also called pads) which are disposed near the edge portion of the substrate 4. As shown in FIG. 6, a flexible circuit board (also called Chip On Film and the like) 12 in which chips such as an after-mentioned reading IC 16 and a gate IC 15c constituting a gate driver 15b of the scan activation unit 15 are embedded is connected with the input/output terminals 11 via the anisotropic conductive adhesive 13 such as an Anisotropic Conductive Film and an Anisotropic Conductive Paste.

Then, the flexible circuit board 12 is drawn around to the side of the back surface 4b of the substrate 4 so as to be connected to the above mentioned PCB board 33 at the side of the back surface 4b. In such way, the sensor panel SP of the radiation image capturing apparatus 1 is formed. In FIG. 6, electronic components 32 and the like are omitted in the drawing.

Figure 7:
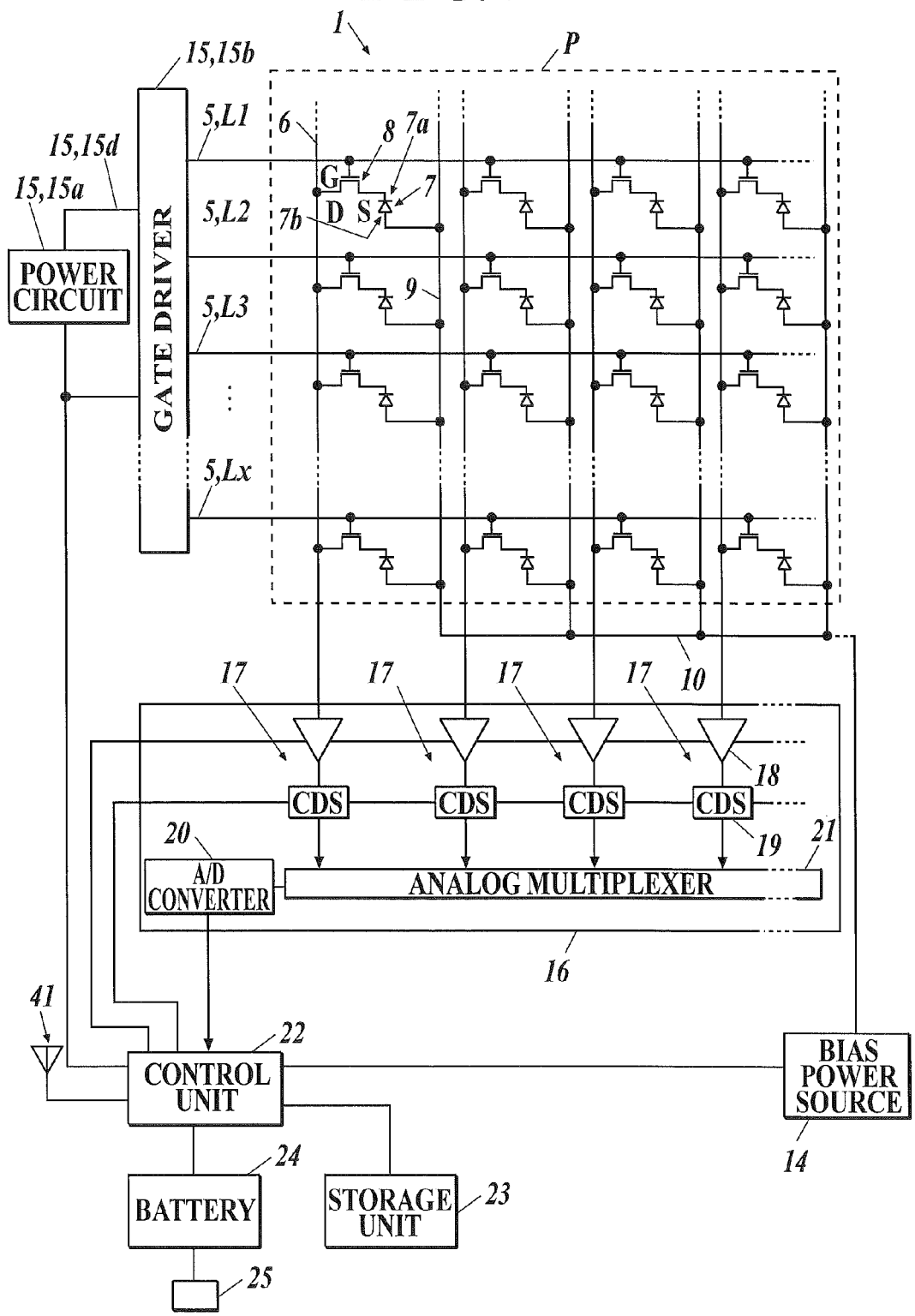
FIG. 7 is a block diagram showing an equivalent circuit of the radiation image capturing apparatus.

Here, the circuit configuration of the radiation image capturing apparatus 1 will be described. FIG. 7 is a block diagram illustrating an equivalent circuit of the radiation image capturing apparatus 1 according to the embodiment, and FIG. 8 is a block diagram illustrating an equivalent circuit for one pixel which is included in the detection part P.

As mentioned above, each of the bias lines 9 is connected to the second electrodes 7b of the radiation detection elements 7 in the detection part P of the substrate 4, tied to the connection line 10 and connected to the bias power source 14. The bias power source 14 applies reverse bias voltage (that is, voltage equal to or lower than voltage applied to a first electrode 7a side of the radiation detection element 7) to the second electrode 7b of each of the radiation detection elements 7 via the connection line 10 and each of the bias lines 9.

The scan activation unit 15 includes a power circuit 15a which supplies ON voltage or OFF voltage to the gate driver 15b via a wiring 15d and the gate driver 15b which switches voltage to be applied to each of lines L1 to Lx which are the scanning lines 5 between ON voltage and OFF voltage to switch between ON state and OFF state in each TFT 8. In the embodiment, the gate driver 15b is configured by including a plurality of abovementioned gate IC 15c (see FIG. 6) disposed in parallel with each other.

Figure 8:
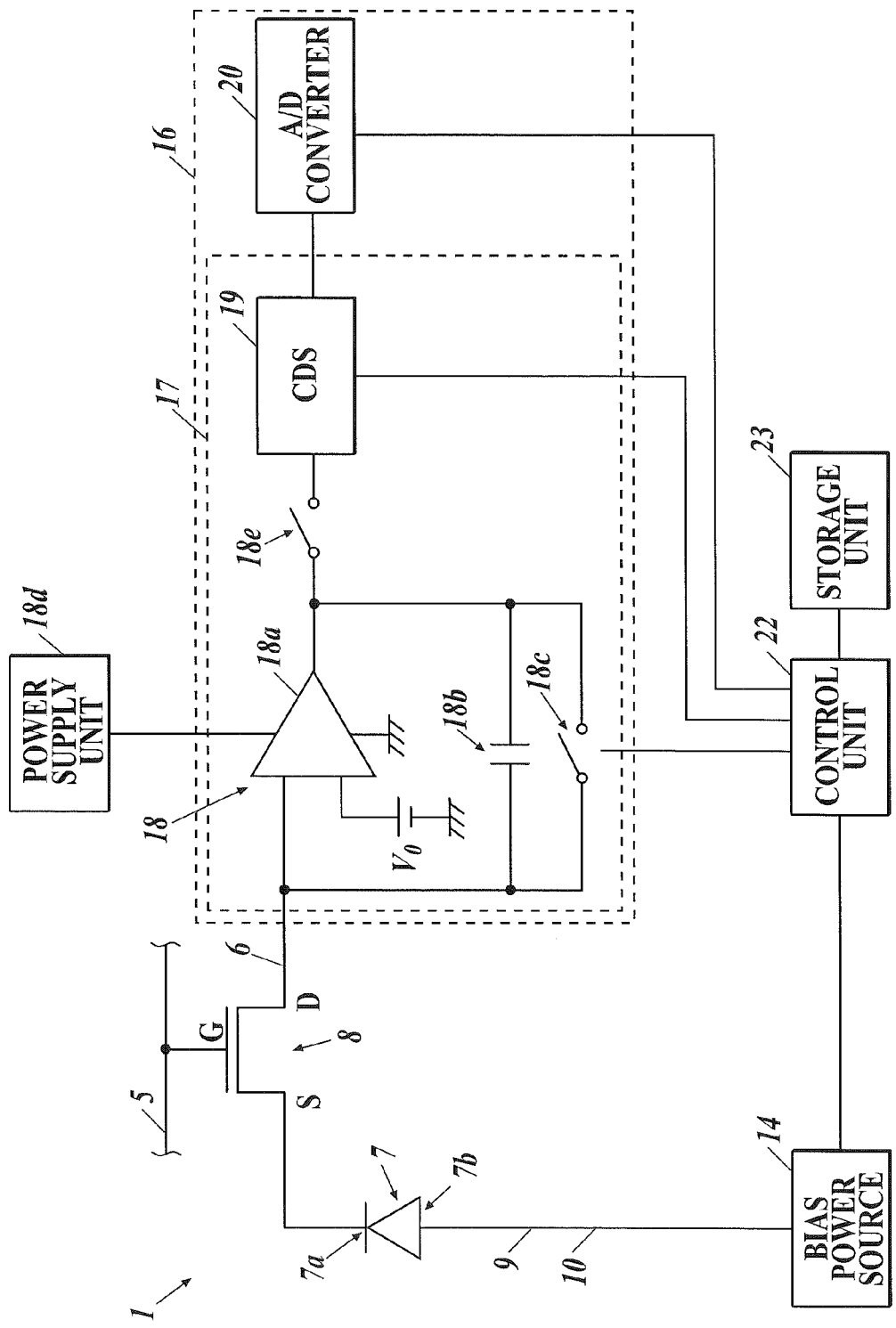
FIG. 8 is a block diagram showing an equivalent circuit for one pixel which is included in the detection part.

As shown in FIGS. 7 and 8, the signal lines 6 are respectively connected to reading circuits 17 built in a reading IC 16. Each reading circuit 17 includes an amplifier circuit 18, a correlated double sampling circuit 19 and the like. In the reading IC 16, an analog multiplexer 21 and an A/D converter 20 are further provided. Here, the correlated double sampling circuits 19 are indicated as CDSs in FIGS. 7 and 8. Also, the analog multiplexer 21 is omitted in FIG. 8.

In the embodiment, each amplifier circuit 18 is configured as a charge amplifier circuit which includes an operational amplifier 18a, a condenser 18b and an electric charge resetting switch 18c being connected in parallel with the operational amplifier 18a and a power supply unit 18d supplying power to the operational amplifier 18a and the like. Further, the signal line 6 is connected to the inverting input terminal at the input side of the operational amplifier 18a of the amplifier circuit 18, and standard voltage $V_0$ is to be applied to the non-inverting input terminal at the input side of the amplifier circuit 18.

Further, the electric charge resetting switch 18c of the amplifier circuit 18 is connected to a control unit 22, and ON/OFF of the electric charge resetting switch 18c is controlled by the control unit 22. Further, between the operational amplifier 18a and the correlated double sampling circuit 19, a switch 18e which opens and closes in conjunction with the electric charge resetting switch 18c is provided, and the switch 18e is turned off or on in conjunction with the ON/OFF operation of the electric charge resetting switch 18c.

In the radiation image capturing apparatus 1, when reset processing of each radiation detection element 7 for removing electric charges which remain in each of the radiation detection elements 7 is performed, as shown in FIG. 9, each TFT 8 is in an ON state while the electric charge resetting switch 18c is in an ON state (and while the switch 18e is in an OFF state).

Further, the electric charges are released from each of the radiation detection elements 7 to the signal line 6 via each TFT 8 in an ON state, pass the electric charge resetting switch 18c of the amplifier circuit 18, pass through the operational amplifier 18a from the output terminal side of the operational amplifier 18a and get out from the non-inverting input terminal to be grounded or flow into the power supply unit 18d. In such way, reset processing of each radiation detection element 7 is performed.

On the other hand, in reading processing of image data D from each radiation detection element 7, as shown in FIG. 10, electric charges are accumulated in the condenser 18b of the amplifier circuit 18 when the electric charges are released from each of the radiation detection elements 7 to the signal line 6 via each TFT 8 which is made to be in an ON state in a state where the electric charge resetting switch 18c of the amplifier circuit 18 is made to be in an OFF state (and a switch 18e in an ON state).

In the amplifier circuit 18, the voltage value according to the amount of electric charges accumulated in the condenser 18b is output from the output side of the operational amplifier 18a, and by the amplifier circuit 18, the charge-voltage conversion is carried out on the electric charges which flowed out from each radiation detection element 7.

When a pulse signal Sp1 (see FIG. 10) is sent from the control unit 22 before the electric charges flow out from each of the radiation detection elements 7, the correlated double sampling circuit (CDS) 19 which is provided at the output side of the amplifier circuit 18 holds the voltage value Vin which is output from the amplifier circuit 18 at that time. When a pulse signal Sp2 is sent from the control unit 22 after the electric charges which flow out from each of the radiation detection elements 7 as mentioned above are accumulated in the condenser 18*b* of the amplifier circuit 18, the correlated double sampling circuit (CDS) 19 holds the voltage value Vfi which is output from the amplifier circuit 18 at that time.

Then, the correlated double sampling circuit 19 calculates the difference Vfi-Vin in the voltage values and outputs the calculated difference Vfi-Vin to the downstream side as image data D of analog value. The image data D of each of the radiation detection elements 7 which is output from the correlated double sampling circuit 19 is sent to the A/D converter 20 via the analog multiplexer 21 sequentially, converted into image data D of digital value sequentially in the A/D converter 20 and output to a storage unit 23 to be stored sequentially.

The control unit 22 includes a computer in which CPU (Central Processing Unit), ROM (Read Only Memory), RAM (Random Access Memory), input/output interface and the like which are not shown in the drawings are connected to the bus and FPGA (Field Programmable Gate Array). The control unit 22 may be configured as a specialized control circuit. The control unit 22 controls operation and the like of each member of the radiation image capturing apparatus 1. Further, as shown in FIG. 7 for example, the storage unit 23 which includes SRAM (Static RAM), SDRAM (Synchronous DRAM) and the like is connected to the control unit 22.

Also, in the embodiment, the abovementioned antenna device 41 is connected to the control unit 22, and further, a battery 24 for supplying power to members such as the detection part P, the scan activation unit 15, the reading circuit 17, the storage unit 23 and the bias power source 14 are connected to the control unit 22. In addition, a connection terminal 25 which is used when charging the battery 24 by supplying power to the battery 24 from a charging device (not shown in the drawings).

As mentioned above, the control unit 22 controls the operation of each function part of the radiation image capturing apparatus 1 such as to control the scan activation unit 15, the reading circuit 17 and the like so as to perform reading processing of image data D, reset processing of each of the radiation detection elements 7 and the like.

Further, in the embodiment, as mentioned above, in order to reduce power consumption, the radiation image capturing apparatus 1 is configured so as to switch power consumption mode between the image capturing mode in which radiation image capturing can be performed by supplying power to the scan activation unit 15 and each reading circuit 17, applying reverse-bias voltage from the bias power source 14 to each of the radiation detection elements 7 and such like and the sleep mode in which the power supply is stopped and power is only supplied to necessary function parts such as the antenna device 41 and the like. Here, in the sleep mode, radiation image capturing cannot be carried out.

In the embodiment, this switching of power consumption mode can be carried out by sending a wake up signal and such like to switch from the sleep mode to the image capturing mode from the console 58 to the radiation image capturing apparatus 1 or by a radiation technologist operating the alternation switch 38 (see FIG. 1).

Here, when the alternation switch 38 is operated and the power consumption mode is switched from the sleep mode to the image capturing mode, the control unit 22 sends a signal indicating the switching to the image capturing mode to the console 58. Also, when the power switch 37 is operated by a radiation technologist to turn on the power, or before the power becomes off when the power is operated to be turned off, the control unit 22 sends a signal indicating that the power is turned on or off to the console 58.

Also, in the embodiment, the radiation image capturing apparatus 1 detects start of radiation irradiation by itself when radiation image capturing is performed in the non-cooperation method. However, the control configuration and the like for the above detection will be described after the configuration and the like of the radiation image capturing system according to the embodiment are described.

[Radiation Image Capturing System]

Figure 11:
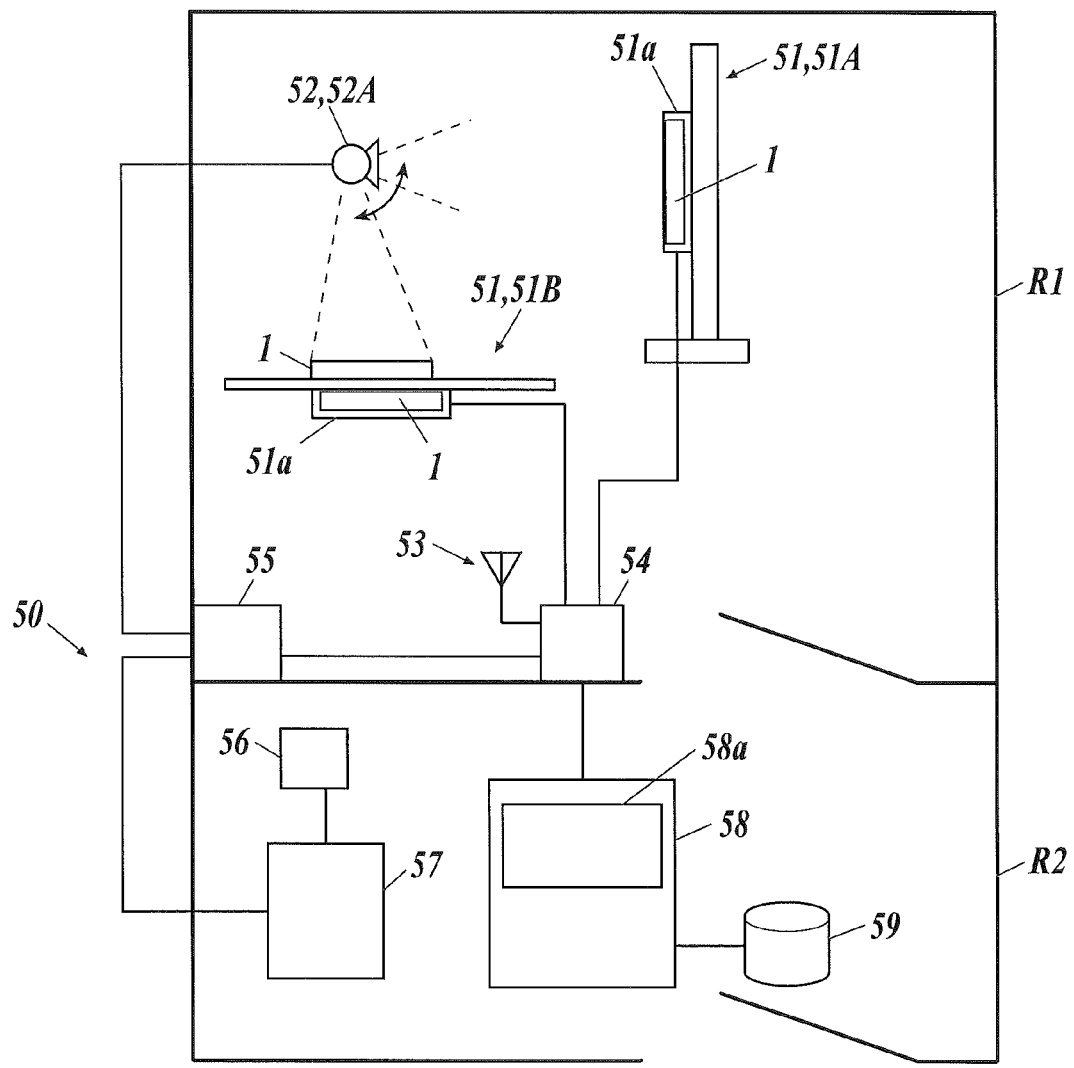

Subsequently, the radiation image capturing system 50 according to the embodiment will be described. FIG. 11 is a diagram showing a configuration example of the radiation image capturing system 50 according to the embodiment. FIG. 11 shows a case where the radiation image capturing system 50 is established in a radiation image capturing room R1 or the like.

A bucky 51 is set in the radiation image capturing room R1 and the bucky 51 is used by loading the above described radiation image capturing apparatus 1 in the cassette holding part (also called a cassette holder) 51*a* thereof. Here, FIG. 11 shows a case where a bucky 51A for standing position radiation image capturing and a bucky 51B for recumbent position radiation image capturing are set as buckies 51. However, only one of the buckies 51 may be provided, for example.

As shown in FIG. 11, the radiation image capturing room R1 is provided with at least one radiation source 52A which emits radiation onto the radiation image capturing apparatus 1 loaded in the bucky 51 via the target body. In the embodiment, both of the bucky 51A for standing position radiation image capturing and the bucky 51B for recumbent position radiation image capturing can be irradiated with radiation by moving the position of the radiation source 52A or changing the irradiation direction of radiation.

The radiation image capturing room R1 is provided with a relaying device (also called a base station, for example) 54 for relaying communication between devices in the radiation image capturing room R1 and devices outside the radiation image capturing room R1, for example. Here, in the embodiment, the relaying device 54 is provided with a wireless antenna (also called an access point) 53 so that the radiation image capturing apparatus 1 can send and receive image data D, signals and the like in a wireless system.

Also, the relaying device 54 is connected to the radiation generation apparatus 55 and the console 58. A converter (not shown in the drawings) which converts signals for LAN (Local Area Network) communication to be sent from the radiation image capturing apparatus 1, the console 58 and the like to the radiation generation apparatus 55 into signals for the radiation generation apparatus 55 and which also performs a conversion opposite of the above conversion is built in the relaying device 54.

In the embodiment, a front room (also called an operation room and the like) R2 is provided with an operational table 57 of the radiation generation apparatus 55, and the operational table 57 is provided with an exposure switch 56 for an operator such as a radiation technologist to operate so as to instruct the radiation generation apparatus 55 to start radiation irradiation and the like.

The radiation generation apparatus 55 carries out various controls such as moving the radiation source 52 to the predetermined position, adjusting the irradiation direction, adjusting diaphragm, collimator and the like which are not shown in the drawings so as to irradiate inside the predetermined area in the radiation image capturing apparatus 1 with radiation, or adjusting the radiation source 52 so as to emit an appropriate amount of radiation, for example.

As shown in FIG. 11, in the embodiment, a console 58 which includes a computer and the like is provided in the front room R2. Here, the console 58 can be configured to be provided in the radiation image capturing room R1, outside the front room R2, in another room and the like and the console 58 is set in an appropriate place.

Further, the console 58 is provided with a display part 58*a* which is configured by including CRT (Cathode Ray Tube), LCD (Liquid Crystal Display) and the like, and is also provided with an input unit such as a mouse and a keyboard which are not shown in the drawings. Also, a storage unit 59 which includes HDD (Hard Disk Drive) and the like is connected to or built in the console 58.

Figure 12:
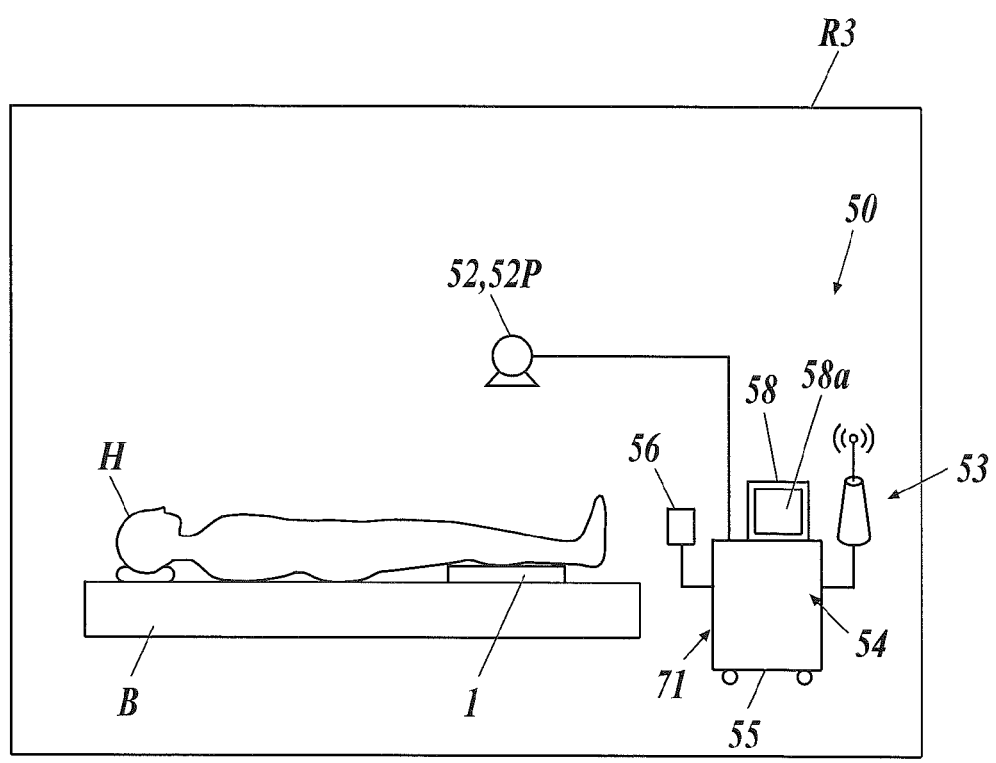
FIG. 12 is a diagram illustrating a configuration example of a radiation image capturing system according to the embodiment which is established in a visiting car.

On the other hand, as shown in FIG. 12, the radiation image capturing apparatus 1 can also be used separately without being loaded in the bucky 51. For example, in a case where a patient H cannot rise from a bed B in a patient's room R3 and thus cannot go to the radiation image capturing room R1, as shown in FIG. 12, the radiation image capturing apparatus 1 can be taken into the patient's room R3 to be used by being placed between the bed B and the patient body or by being held against the patient body.

In addition, in a case where the radiation image capturing apparatus 1 is used in the patient's room R3 and the like, instead of the radiation generation apparatus 55 which is installed in the above-mentioned radiation image capturing room R1, as shown in FIG. 12, a so-called portable radiation generation apparatus 55 is taken into the patient's room R3 by being mounted on the visiting car 71 and the like, for example. In this case, it is configured so that the radiation image capturing apparatus 1 can be irradiated with radiation 52P of the portable radiation generation apparatus 55 in arbitrary directions and the radiation irradiation can be performed from an appropriate distance or in an appropriate direction to the radiation image capturing apparatus 1 which is placed between the bed B and the patient body or held against the patient body.

Further, in this case, a relaying device 54 provided with a wireless antenna 53 is built in the radiation generation apparatus 55, and as described above, the relaying device 54 is configured so as to relay communication between the radiation generation apparatus 55 and the console 58, communication between the radiation image capturing apparatus 1 and the console 58, sending of image data D and the like.

Here, as shown in FIG. 11, the radiation image capturing apparatus 1 can be used by being placed between a patient body which is recumbent on the bucky 51B for recumbent position radiation image capturing in the radiation image capturing room R1 and the bucky 51B or being held against the patient body on the bucky 51B for recumbent position radiation image capturing. In this case, either of the both portable radiation 52P and the radiation source 52A installed in the radiation image capturing room R1 can be used.

The console 58 is configured so as to communicate with the radiation image capturing apparatus 1 in the wireless system or the wired system, and as mentioned above, is configured so as to send the wake up signal to the radiation image capturing apparatus 1 to switch the power consumption mode of the radiation image capturing apparatus 1 from the sleep mode to the image capturing mode. Also, the console 58 can be configured so as to send a sleep signal to the radiation image capturing apparatus 1 from the console 58 so as to switch the power consumption mode of the radiation image capturing apparatus 1 from the image capturing mode to the sleep mode.

Also, in addition to a case where there is one radiation image capturing apparatus 1 to be managed, even in a case where there are a plurality of the radiation image capturing apparatuses 1, the console 58 stores information of power consumption modes of the radiation image capturing apparatuses 1 (that is, whether they are in the image capturing mode or the sleep mode) or information on ON/OFF of the power in the storage unit 59 (see FIG. 11. The storage unit 59 is connected to the console 58 though it is not shown in FIG. 12), for example, to manage the conditions.

Further, in the embodiment, as after-mentioned, the console 58 is configured so as to generate a preview image I_pre and display the image on the display part 58*a* every time thinned data Dt is sent thereto when the thinned data Dt is sent as data for preview image from the radiation image capturing apparatus 1. This will be described later.

Also, as after-mentioned, when the remaining image data D and the like are sent from the radiation image capturing apparatus 1 subsequently, the console 58 restores the original entire image data D from the thinned data Dt and the remaining image data D, carries out accurate image processing such as gain correction, defect pixel correction, tone processing according to the radiation image captured part and the like on the basis of the restored data, after-mentioned off set data O and the like to generate a final radiation image I.

[Processing when Radiation Image Capturing is Performed in Various Methods]

Next, processing in a case where radiation image capturing is performed in the cooperation method and processing in a case where radiation image capturing is performed in the non-cooperation method using the above described radiation image capturing apparatus 1 will be described.

[Processing when Radiation Image Capturing is Performed in the Cooperation Method]

In the embodiment, in a case where radiation image capturing is performed in the cooperation method, the control unit 22 of the radiation image capturing apparatus 1 normally performs reset processing of each radiation detection element 7 first. In the reset processing of each radiation detection element 7, as shown in FIG. 13 for example, ON voltage is applied from the gate driver 15*b* (see FIG. 7) of the scan activation unit 15 to each of the lines L1 to Lx which are the scanning lines 5, ON voltage is applied to the gate electrode 8*g* of each TFT 8 to turn on the TFT 8, and electric charges remaining in each radiation detection element 7 are released from the radiation detection element 7 to a signal line 6 to be removed.

Figure 13:
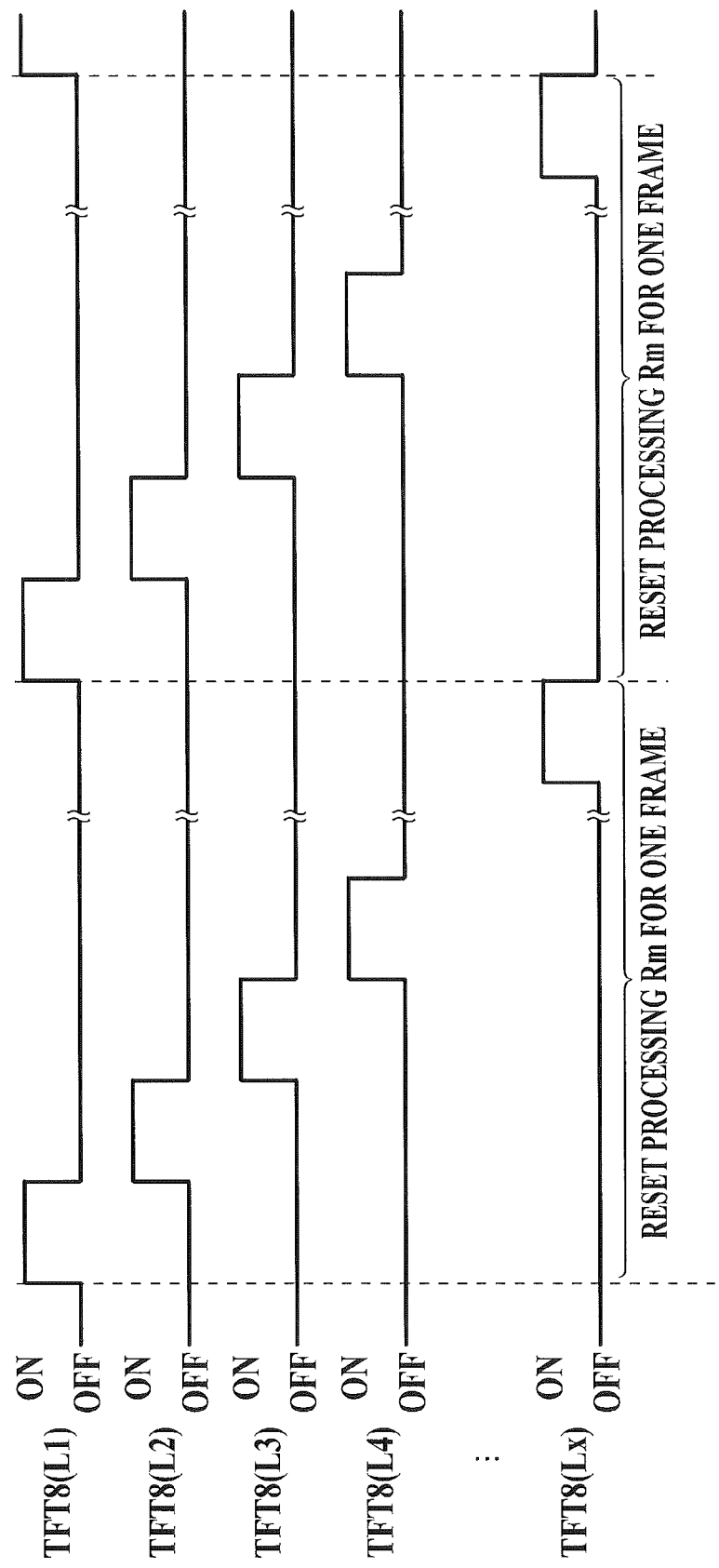
FIG. 13 is a timing chart in reset processing of radiation detection elements which are carried out in the radiation image capturing apparatus.

Then, as shown in FIG. 13, the scanning lines 5 to which ON voltage is applied are switched sequentially, ON voltage is applied to the lines L1 to Lx which are the scanning lines 5 sequentially and reset processing is performed on each radiation detection element 7. In such way, the control unit 22 is configured so as to repeatedly perform the reset processing Rm for one frame of the detection part P which is performed by applying ON voltage to the first line L1 to the last line Lx which are the scanning lines 5 sequentially.

Figure 14:
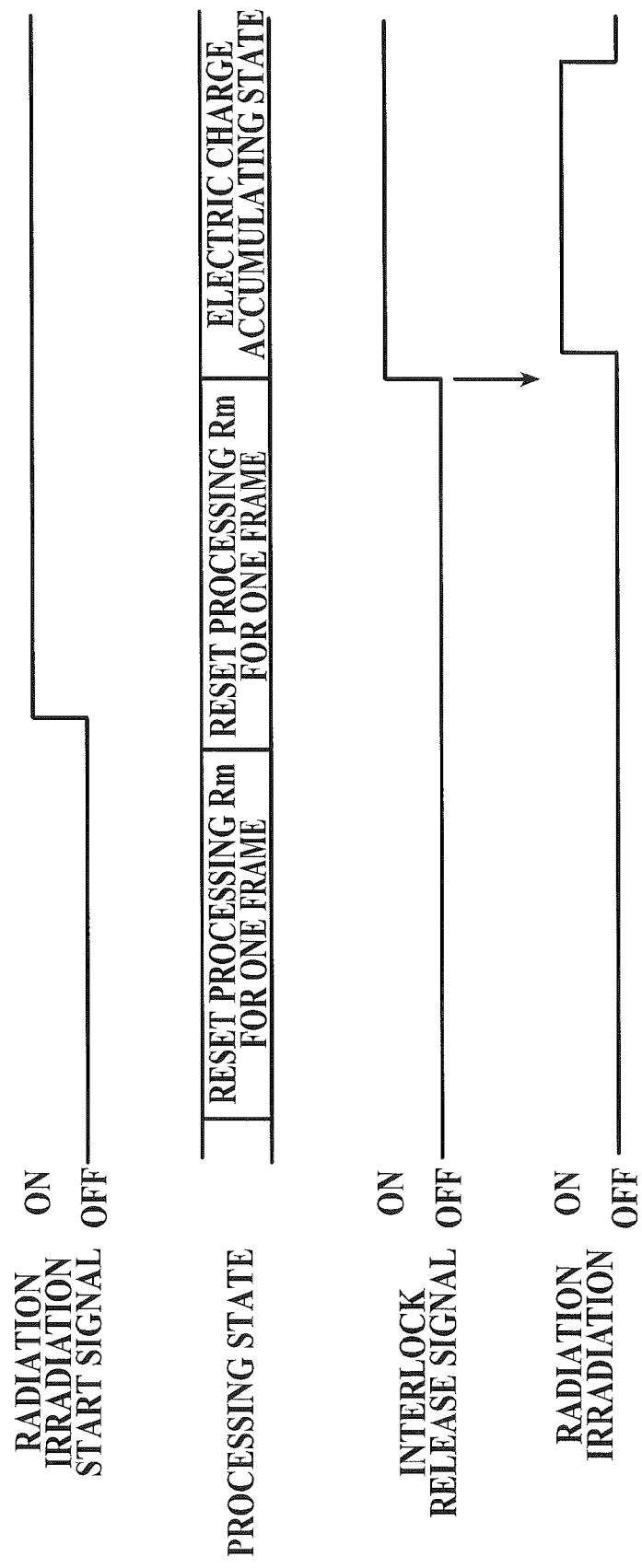
FIG. 14 is a timing chart showing a timing of sending radiation irradiation start signal, termination of reset processing and switch to an electric charge accumulating state, sending interlock release signal and radiation irradiation in the cooperation method.

Then, as shown in FIG. 14, during the reset processing Rm for one frame, when the exposure switch 56 is operated at the radiation generation apparatus 55 side and a radiation irradiation start signal is sent from the radiation generation apparatus 55 to the radiation image capturing apparatus 1 as mentioned above, the control unit 22 of the radiation image capturing apparatus 1 ends reset processing of each radiation detection element 7 at the time when reset processing Rm for one frame which is being performed when the radiation irradiation start signal is sent is completed.

Then, OFF voltage is applied from the scan activation unit 15 to all the lines L1 to Lx which are the scanning lines 5 to turn off all the TFTs 8 so as to switch to the electric charge accumulating state in which the electric charges generated in each radiation detection element 7 by radiation irradiation are accumulated in each radiation detection element 7.

Also, at the time when reset processing Rm for one frame is completed as described above, the control unit 22 sends the interlock release signal to the radiation generation apparatus 55. When the radiation generation apparatus 55 receives the interlock release signal from the radiation image capturing apparatus 1 via the relaying device 54, the radiation generation apparatus 55 emits radiation onto the radiation image capturing apparatus 1 from the radiation source 52.

Figure 15:
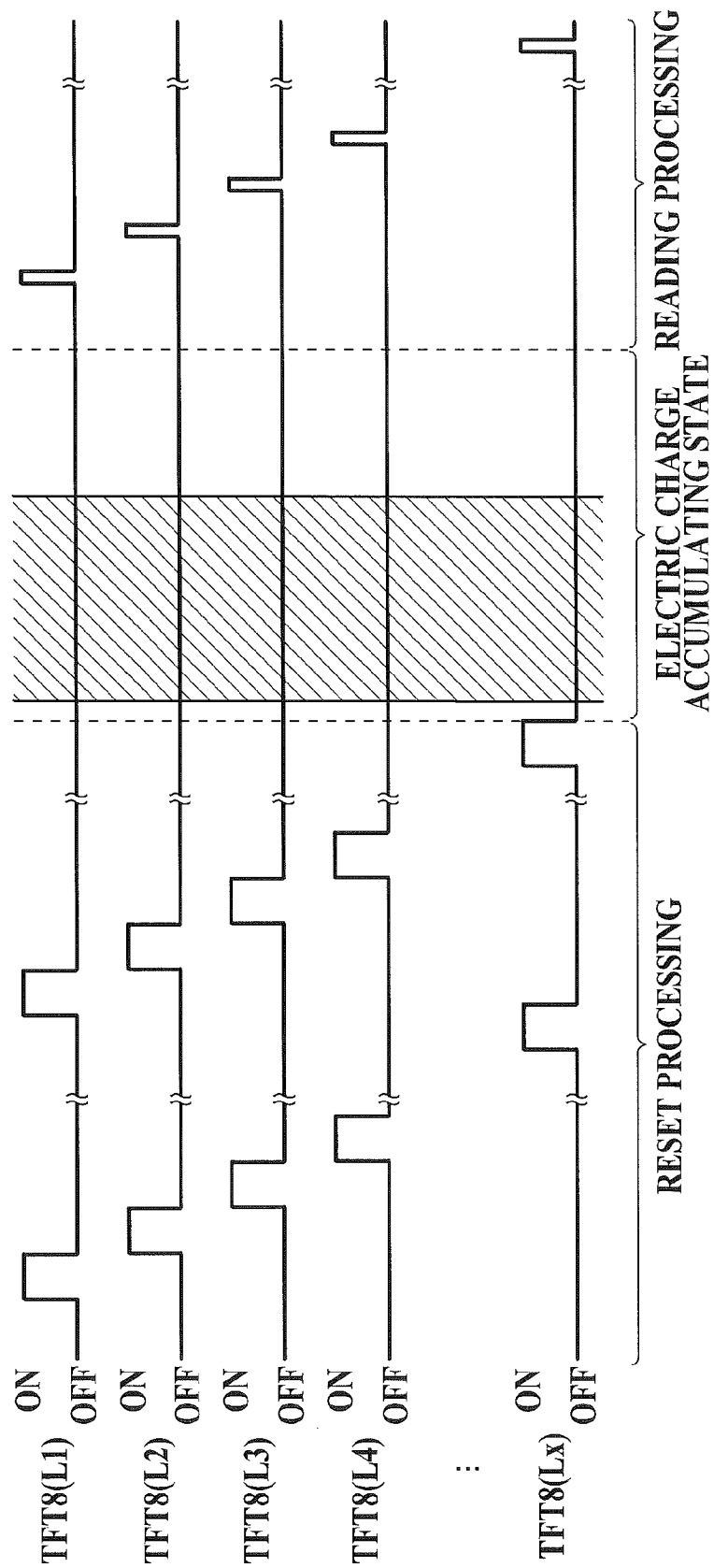
FIG. 15 is a timing chart showing a timing for applying ON voltage to each scanning line in the cooperation method.

After the interlock release signal is sent, when an end signal indicating that radiation irradiation has ended is sent from the radiation generation apparatus 55 or at the time when a predetermined time elapsed after switching to electric charge accumulating state, the control unit 22 of the radiation image capturing apparatus 1 applies ON voltage to the lines L1 to Lx which are the scanning lines 5 sequentially from the first line L1 which is the scanning line 5 and reads out image data D from each radiation detection element 7, as shown in FIG. 15.

Here, the shaded area in FIG. 15 indicates the time period when radiation irradiation is performed. Further, the radiation image capturing apparatus 1 can also be configured so as to measure the radiation exposure dose and send a signal which ends radiation irradiation from the radiation image capturing apparatus 1 to the radiation generation apparatus 55 at the time when the radiation image capturing apparatus 1 is irradiated with radiation of predetermined amount.

[Processing when Radiation Image Capturing is Performed in the Non-Cooperation Method]

Next, processing in the radiation image capturing apparatus 1 in a case where radiation image capturing is performed in the non-cooperation method will be described.

As mentioned above, in a case of non-cooperation method, because signals and the like are not exchanged between the radiation image capturing apparatus 1 and the radiation generation apparatus 55, the radiation image capturing apparatus 1 need to detect the start of radiation irradiation by itself to perform radiation image capturing. Hereinafter, how to detect the start of radiation irradiation in the radiation image capturing apparatus 1 according to the embodiment will be described.

Here, the detection technique according to the embodiment is a detection technique which was newly found by the studies by the present inventors as mentioned earlier. As the detection technique which was newly found by the studies of the present inventors, for example, either one of the following two detection techniques can be adopted.

[Detection Technique 1]

Figure 16:
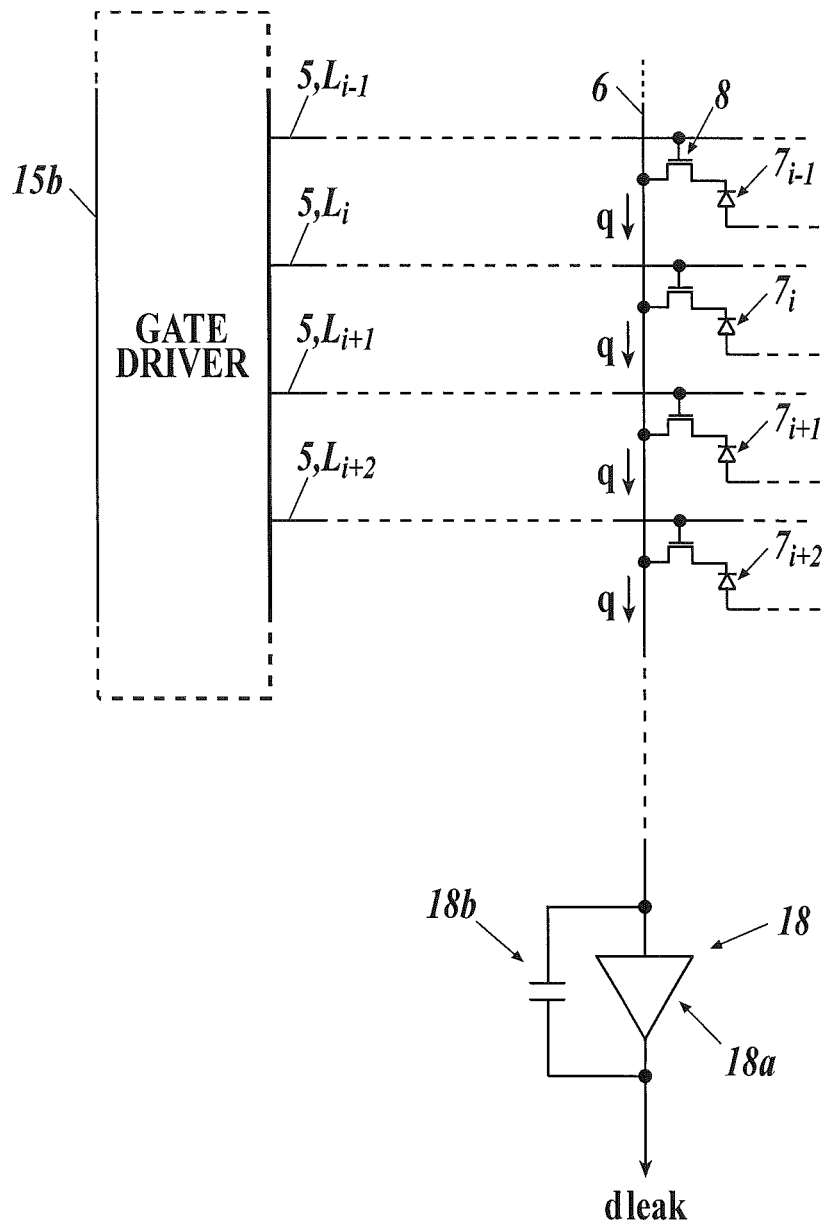
FIG. 16 is a diagram explaining that each of the electric charges which leaked from each radiation detection element via a TFT is read out as leak data in a detection technique 1.

For example, it can be configured so as to repeatedly perform reading processing of leak data dleak before the radiation image capturing apparatus 1 is irradiated with radiation in radiation image capturing. Here, as shown in FIG. 16, leak data dleak is data equivalent to a total value of electric charges q for each signal line 6 which leak from each radiation detection element 7 via each TFT 8 in an OFF state in a state where OFF voltage is applied to each scanning line 5.

Figure 17:
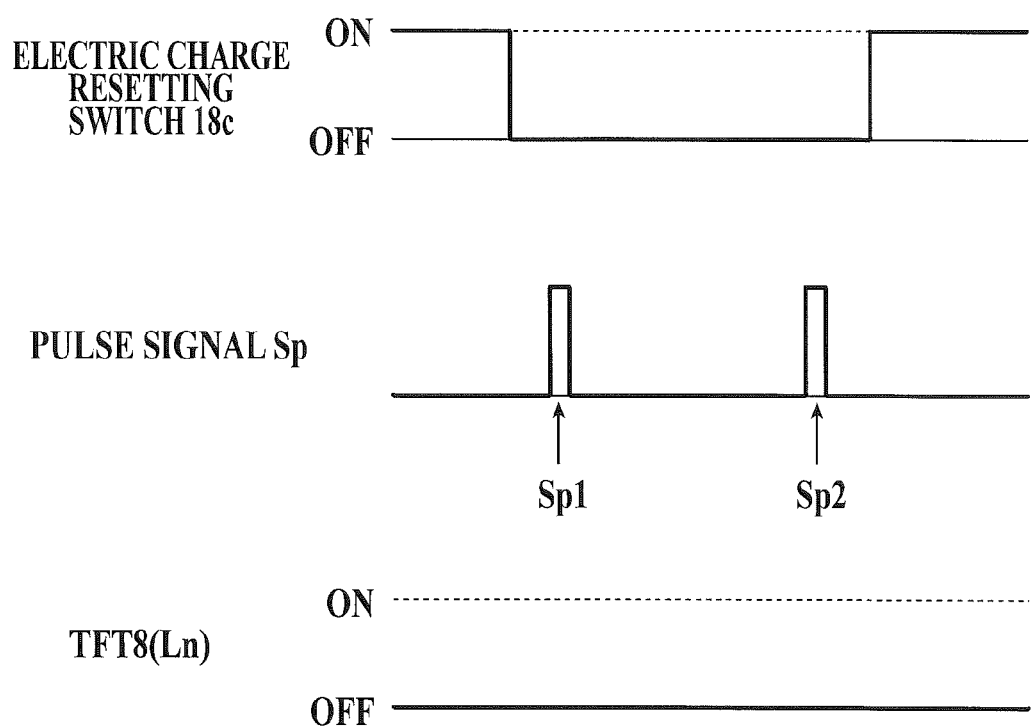
FIG. 17 is a timing chart showing a timing of ON/OFF of an electric charge resetting switch and a TFT in reading processing of leak data.

Then, in reading processing of leak data dleak, unlike in a case of reset processing of each radiation detection element 7 shown in FIG. 9 and read processing of image data D shown in FIG. 10, as shown in FIG. 17, OFF voltage is applied to each of the lines L1 to Lx which is the scanning line 5 to turnoff each TFT 8, and then pulse signals Sp1 and Sp2 are sent from the control unit 22 to the correlated double sampling circuit 19 (see CDS in FIGS. 7 and 8) of each reading circuit 17.

When the pulse signal Sp1 is sent from the control unit 22, the correlated double sampling circuit 19 holds the voltage value Vin which is output from the amplifier circuit 18 at that time. Then, electric charges q which leak from each radiation detection element 7 via each TFT 8 are accumulated in the condenser 18b in the amplifier circuit 18 to raise the voltage value output from the amplifier circuit 18. When the pulse signal Sp2 is sent from the control unit 22, the correlated double sampling circuit 19 holds voltage value Vfi which is output from the amplifier circuit 18 at that time.

Then, the value which the correlated double sampling circuit 19 outputs by calculating the difference in voltage value Vfi-Vin is leak data dleak. The leak data dleak is converted into a digital value by the A/D converter 20 thereafter, as well as in a case of abovementioned reading processing of image data D.

Incidentally, if it is configured so as to repeatedly perform reading processing of leak data dleak only, each TFT 8 remains in an OFF state and dark electric charges which are generated in each radiation detection element 7 continue to be accumulated in each radiation detection element 7.

Figure 18:
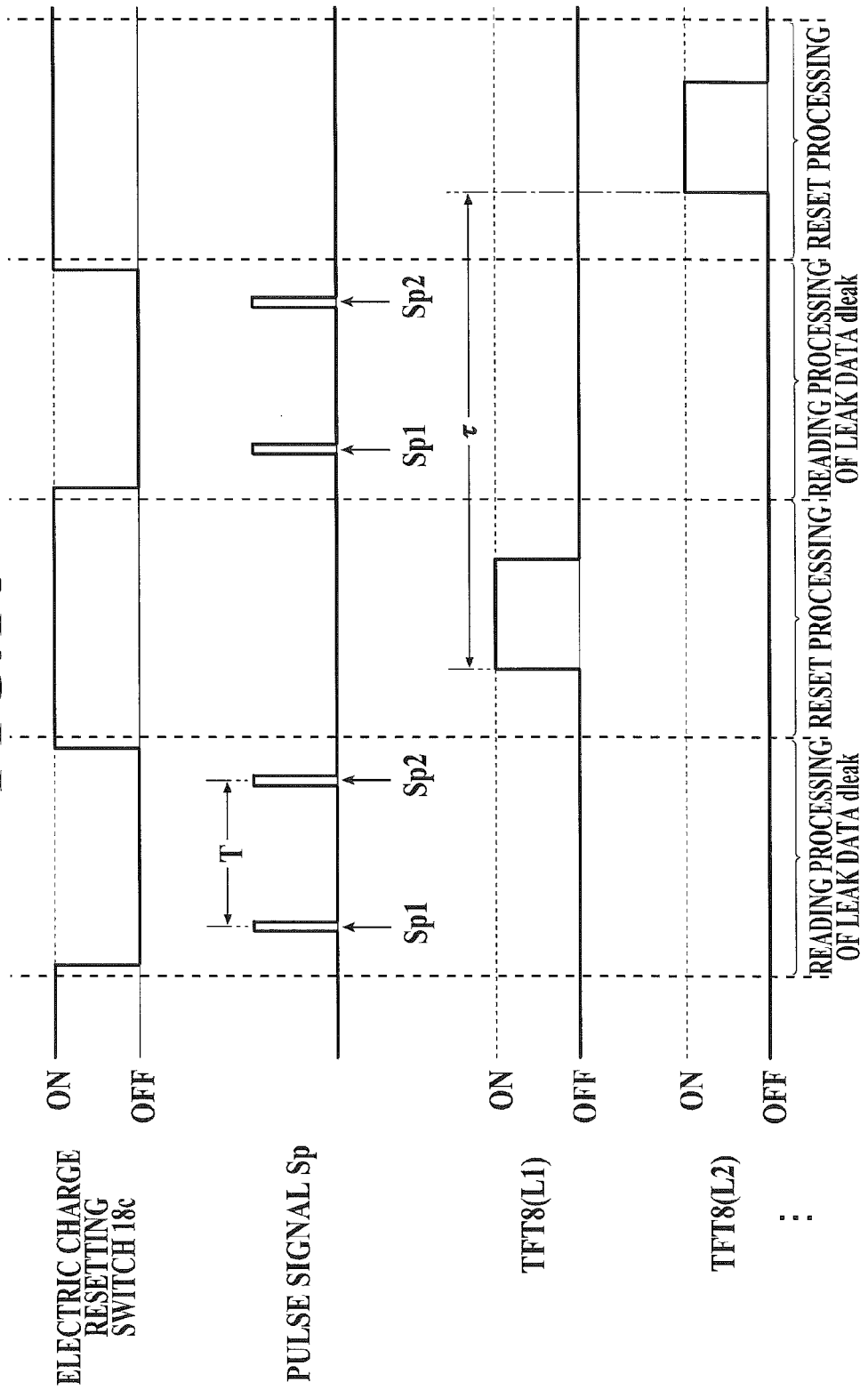
FIG. 18 is a timing chart showing a timing of ON/OFF of an electric charge resetting switch, pulse signal and TFTs in a case where reading processing of leak data and reset processing of each radiation detection element are alternately carried out before radiation image capturing.

Therefore, as described above, in a case where it is configured so as to repeatedly perform the reading processing of leak data dleak before radiation image capturing, as shown in FIG. 18, it is desirable to configure so as to alternately and repeatedly perform the reading processing of leak data dleak which is performed in a state where OFF voltage is applied to each scanning line 5 and the reset processing of each radiation detection element 7 which is performed by applying ON voltage to each of the lines L1 to Lx which is the scanning line 5 sequentially. Here, T, τ and Tac in FIG. 18, after-mentioned FIG. 19 and the like will be described later.

In such configuration where the reading processing of leak data dleak and the reset processing of each radiation detection element 7 are alternatively and repeatedly performed before radiation image capturing, when radiation irradiation of the radiation image capturing apparatus 1 is started, each TFT 8 is irradiated with electromagnetic waves converted from radiation by the scintillator 3 (see FIG. 2). Then, thereby, the electric charges q (see FIG. 18) which leak from each radiation detection element 7 via each TFT 8 increase respectively, and this is shown in the studies by the present inventors.

Figure 19:
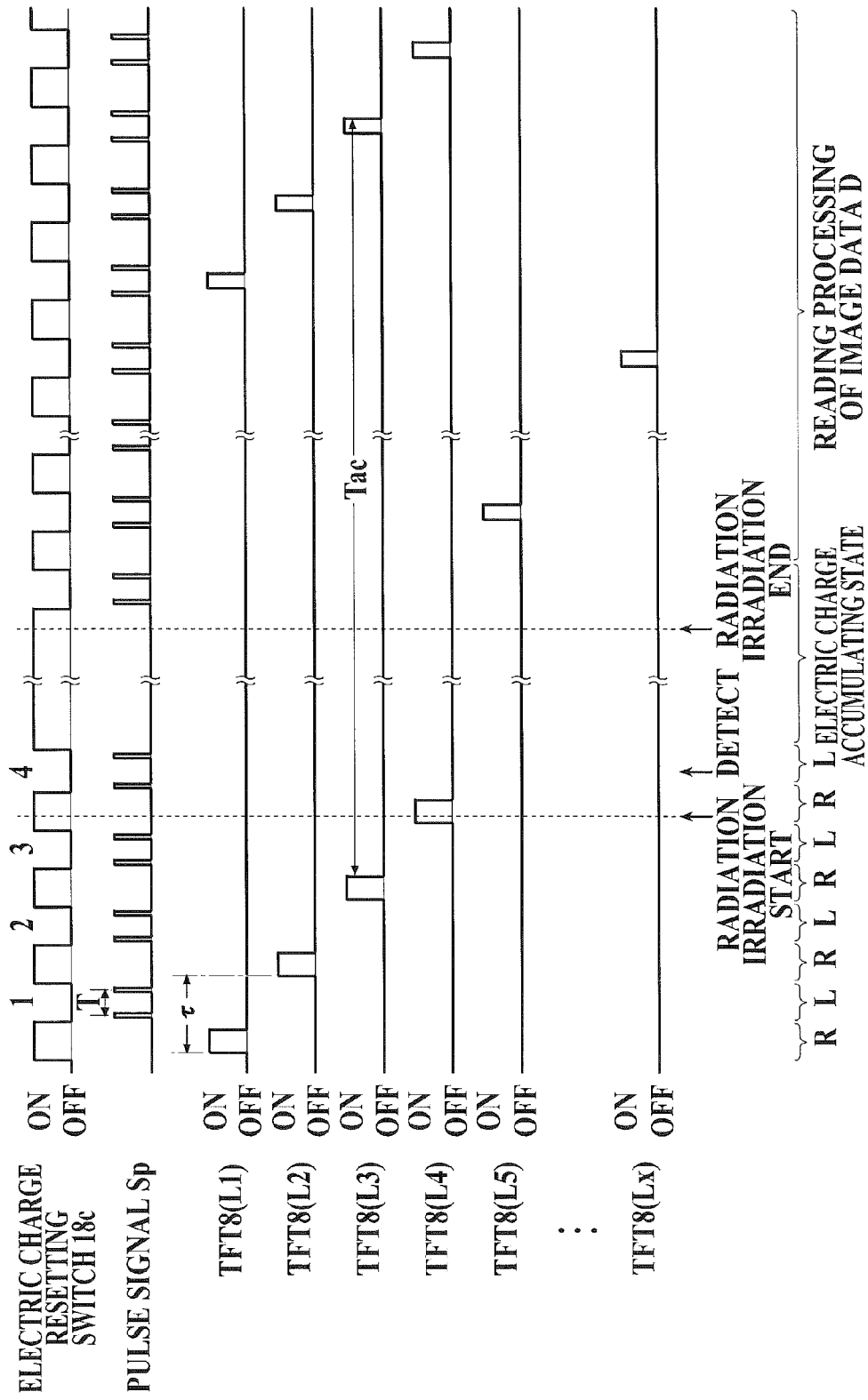
FIG. 19 is a timing chart explaining a timing and the like for applying ON voltage to each scanning line in the detection technique 1.
Figure 20:
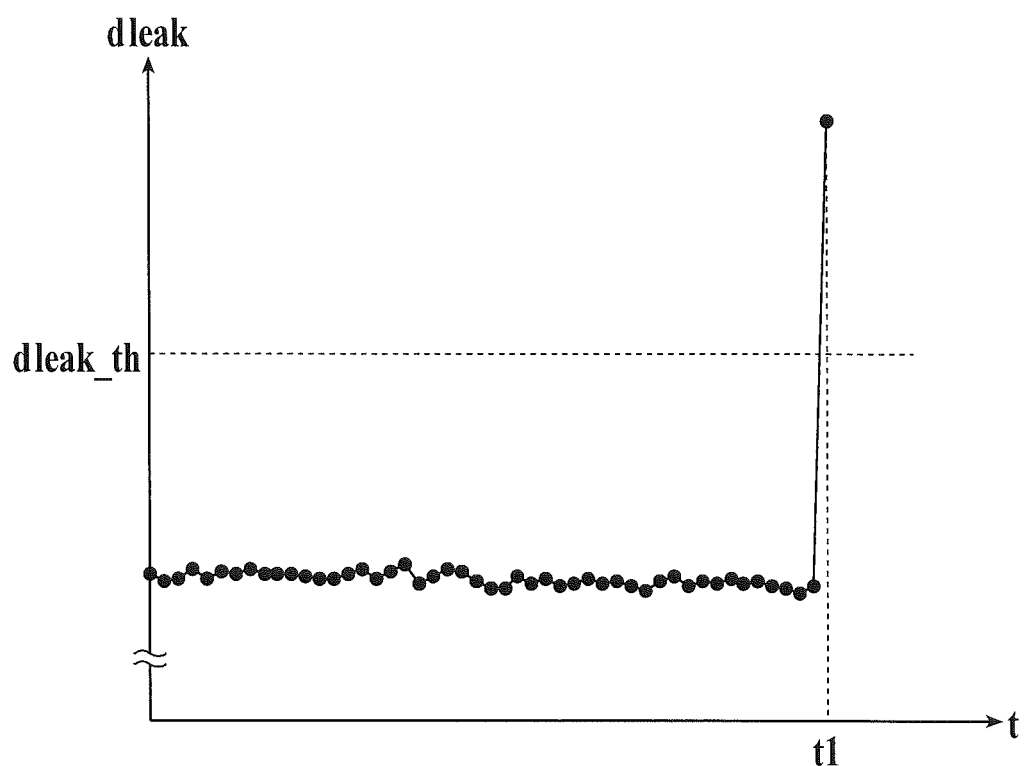
FIG. 20 is a graph showing an example of the read out leak data over time.

Then, as shown in FIG. 19 for example, in a case where reading processing of leak data dleak and reset processing of each radiation detection element 7 are alternatively and repeatedly performed before radiation image capturing, as shown in FIG. 20, leak data dleak which is read out at the time when radiation irradiation of the radiation image capturing apparatus 1 is started becomes a value considerably larger than the leak data dleak which was read out before that.

Here, in FIGS. 19 and 20, the leak data dleak read out in the fourth reading processing after ON voltage is applied to the line L4 which is the scanning line 5 in FIG. 19 to perform reset processing corresponds to the leak data dleak at the time t1 in FIG. 20. Also, in FIG. 19, "R" indicates reset processing of each radiation detection element 7 and "L" indicates reading processing of leak data dleak.

Therefore, it can be configured so that the control unit 22 of the radiation image capturing apparatus 1 monitors leak data dleak read out in the reading processing of leak data dleak before radiation image capturing and detects the start of radiation irradiation at the time when the read out leak data dleak exceeds a predetermined threshold value dleak_th (see FIG. 20) which is previously set, for example. Hereinafter, the scanning line 5 to which ON voltage is applied when radiation irradiation is started or immediately before that as the above line L4 which is the scanning line 5 is called the detection line.

[Detection Technique 2]

Figure 21:
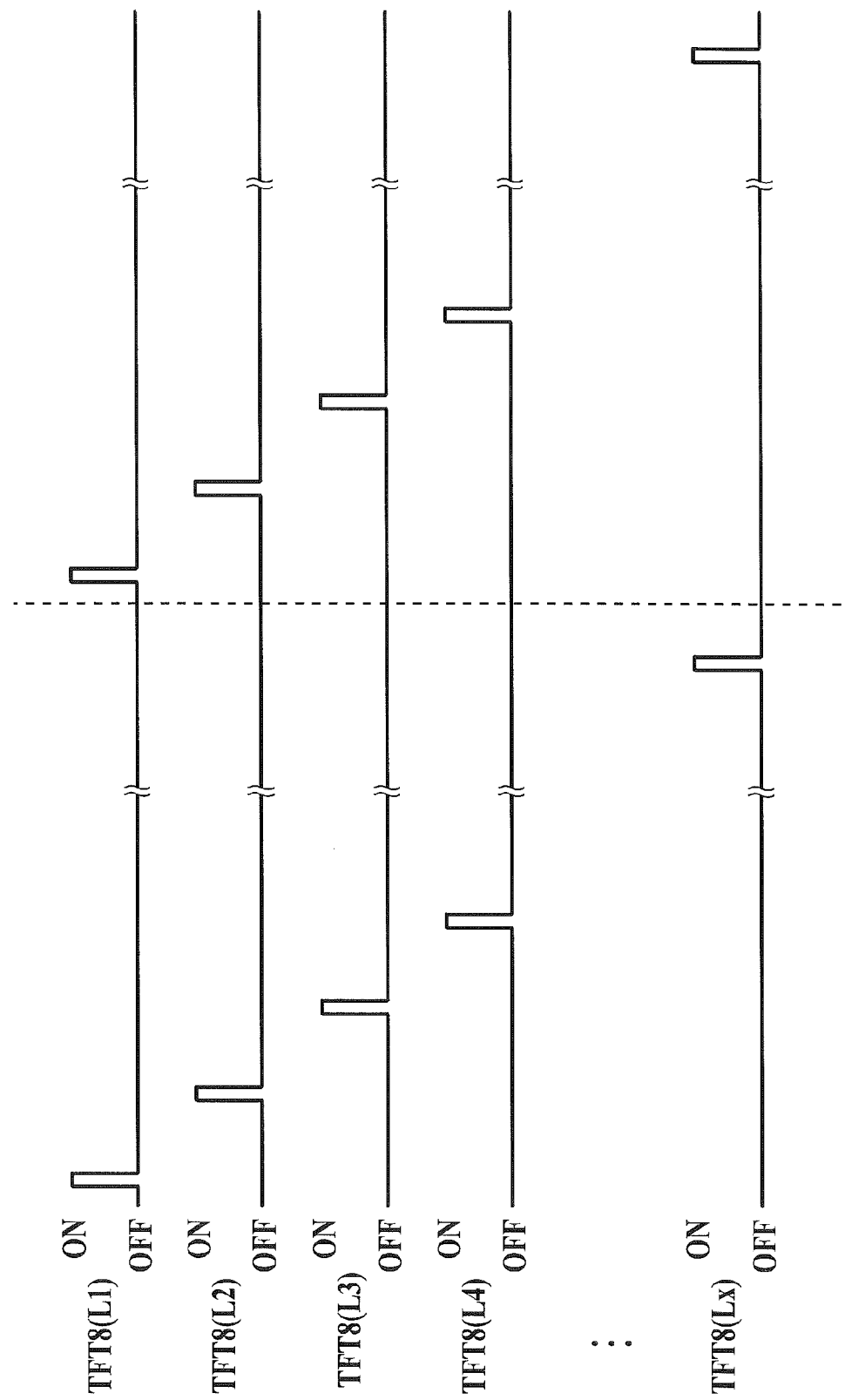
FIG. 21 is a timing chart showing a timing for applying ON voltage to each scanning line sequentially when image data reading processing is repeatedly performed before radiation image capturing in a detection technique 2.

In addition, as in the above detection technique 1, instead of the configuration in which the reading processing of leak data dleak is performed before radiation image capturing, as shown in FIG. 21, it can be configured so as to apply ON voltage from the gate driver 15b of the scan activation unit 15 to each of the lines L1 to Lx which are the scanning lines 5 sequentially and to repeatedly perform reading processing of image data d from each radiation detection element 7 before radiation image capturing.

Here, as mentioned above, in distinction from image data D as the above original image read out immediately after radiation image capturing, hereinafter, the image data read out for detecting start of radiation irradiation before radiation image capturing is called image data d for detecting radiation irradiation start.

Figure 22:
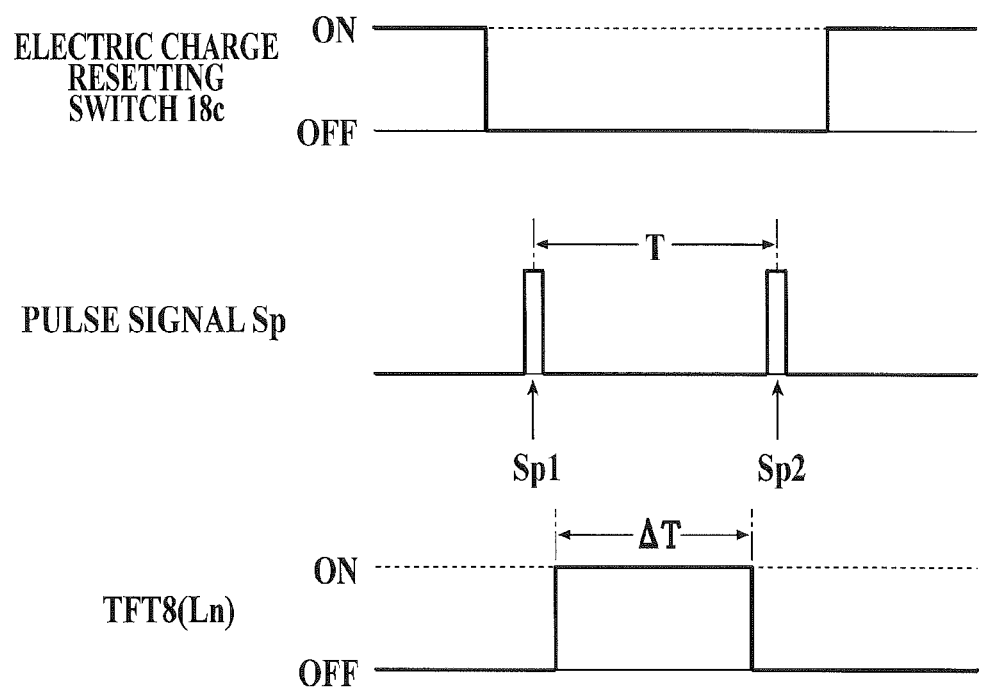
FIG. 22 is a timing chart showing a timing of ON/OFF and ON time ΔT of an electric charge resetting switch, pulse signal and a TFT in image data reading processing before radiation image capturing.

Further, ON/OFF of the electric charge resetting switch 18c of the amplifier circuit 18 of the reading circuit 17 in the reading processing of image data d for detecting radiation irradiation start, sending of pulse signals Sp1 and Sp2 to the correlated double sampling circuit 19 and the like are, as shown in FIG. 22, performed as in the reading processing of image data D shown in FIG. 10. Here, T and ΔT in FIG. 22 and others will be described below.

Figure 23:
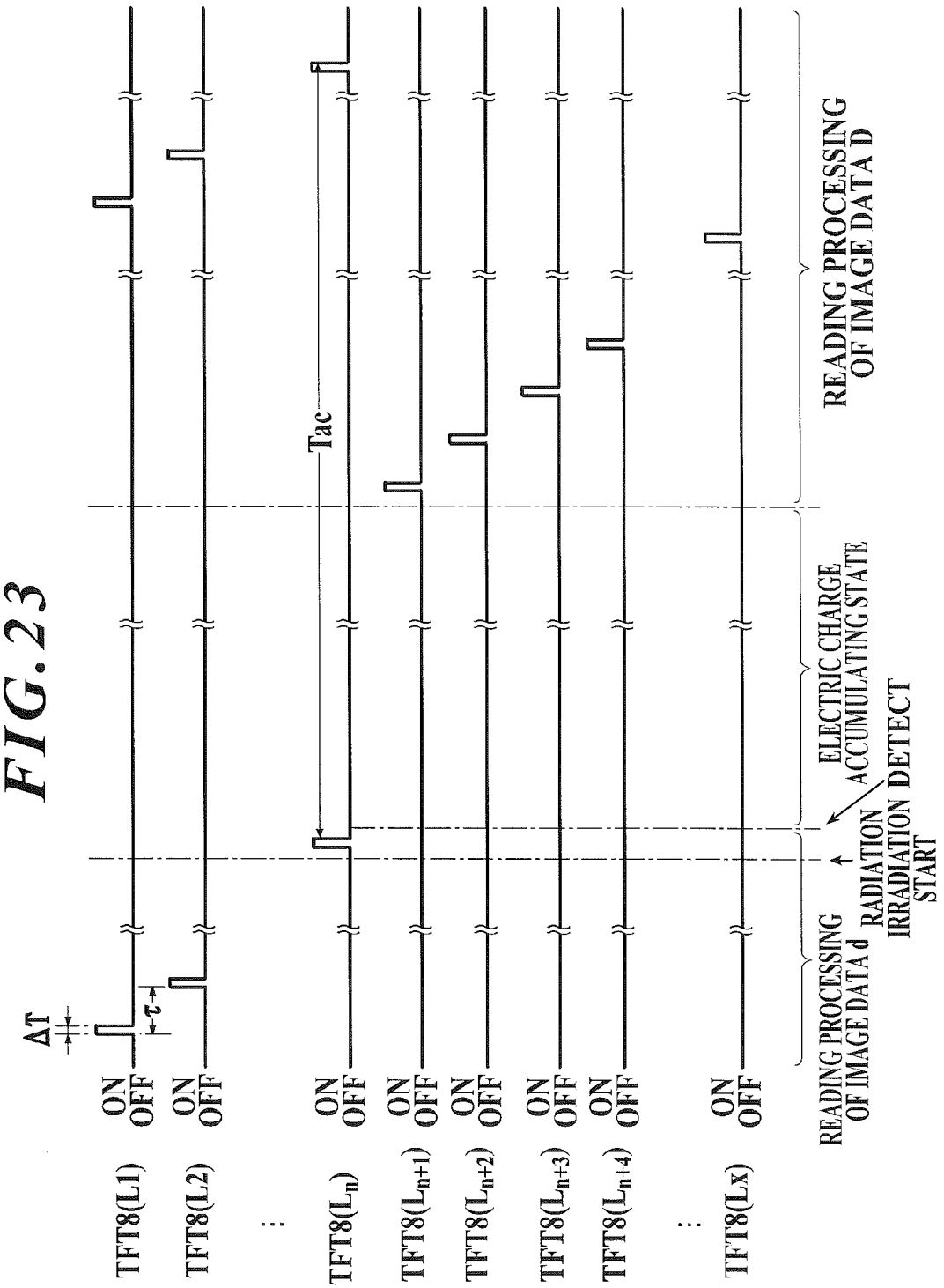
FIG. 23 is a timing chart explaining a timing and such like for applying ON voltage to each scanning line in the detection technique 2.

In the above configuration in which the reading processing of image data d for detecting radiation irradiation start is performed before radiation image capturing, as shown in FIG. 23, when radiation irradiation of the radiation image capturing apparatus 1 is started, image data d for detecting radiation irradiation start which is read out at that time (image data d for detecting radiation irradiation start which is read out by applying ON voltage to the line Ln which is the scanning line 5 in FIG. 23) becomes a value considerably larger than the image data d for detecting radiation irradiation start which was read out before that, as in the case of leak data dleak shown in the abovementioned FIG. 20.

Therefore, it can be configured so that the control unit 22 of the radiation image capturing apparatus 1 monitors the image data d for detecting radiation irradiation start which is read out in the reading processing before radiation image capturing and detects the start of radiation irradiation at the time when the read out image data d for detecting radiation irradiation start exceeds a predetermined threshold value dth which is previously set.

Here, ΔT, τ and Tac in FIG. 23 will be described later. Further, in a case of FIG. 23, the detection line is the line Ln which is the scanning line 5.

[Processing for Improving Detection Sensitivity]

Further, in the above detection technique 1, in reset processing of each radiation detection element 7 before radiation image capturing, if a cycle τ (see FIGS. 18 and 19, for example) from when ON voltage is started to be applied to the scanning line 5 till when ON voltage is started to be applied to the next scanning line 5 is made to be longer and a sending gap T between the two pulse signals Sp1 and Sp2 which are sent from the control unit 22 in reading processing of leak data dleak is made to be longer, the value of leak data dleak which is read out in single time reading processing of leak data dleak becomes larger.

Also, in the above detection technique 2, in the reading processing of image data d for detecting radiation irradiation start before radiation image capturing, if time ΔT (see FIGS. 22 and 23) in which each TFT 8 is turned on, that is, time ΔT (hereinafter, called ON time ΔT) until the switching to OFF voltage after ON voltage is applied from the gate driver 15b of the scan activation unit 15 to the scanning line 5 is made to be longer, the value of image data d for detecting radiation irradiation start which is read out in single time reading processing becomes larger.

Therefore, by the above configuration, sensitivity of detecting radiation irradiation start in the radiation image capturing apparatus 1 can be improved.

Figure 24:
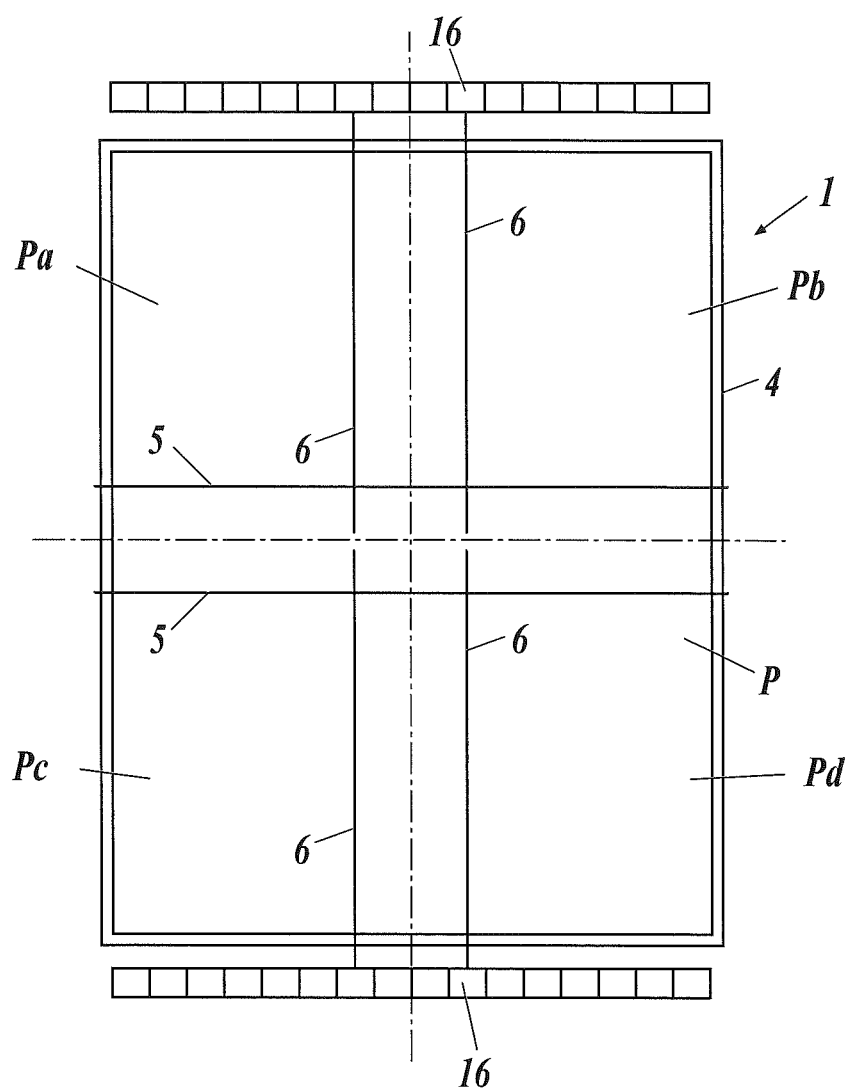
FIG. 24 is a diagram illustrating a state where a detection part is divided into four regions and a reading IC is assigned to each region.

Further, as shown in FIG. 24, there is a case where the detection part P is divided into a plurality of regions, for example, the detection part P (see FIGS. 4 and 7, for example) is divided into four regions Pa to Pd. In such case, it can be configured so that start of radiation irradiation is detected by using the above detection technique 1 or detection technique 2 for each region Pa to pd of the detection part P.

Then, by such configuration, for example, start of radiation irradiation can be detected accurately even in a case where the radiation image capturing apparatus 1 is irradiated with radiation in a narrowed area and only one or several regions among a plurality of regions Pa to Pd of the detection part P are irradiated with radiation.

In either case of the above detection techniques 1 and 2, when the control unit 22 of the radiation image capturing apparatus 1 detects the start of radiation irradiation as mentioned above, as shown in FIG. 19 (in a case of the detection technique 1) and FIG. 23 (in a case of the detection technique 2), the control unit 22 stops applying ON voltage to each scanning line 5 upon detecting the start of radiation irradiation, applies OFF voltage from the gate driver 15b to all the lines L1 to Lx which are the scanning lines 5 and turns off each TFT 8 to switch to an electric charge accumulating state.

Then, the control unit 22 carries out reading processing of image data D as the original image at the time when the predetermined time elapses after start of radiation irradiation is detected, for example.

In the embodiment, as shown in FIGS. 19 and 23, the control unit 22 starts applying ON voltage from the scanning line 5 (the line L5 which is the scanning line 5 in a case of FIG. 19, line Ln+1 which is the scanning line 5 in a case of FIG. 23) to which ON voltage is to be applied next to the abovementioned detection line (line L4 which is the scanning line 5 in a case of FIG. 19, line Ln which is the scanning line 5 in a case of FIG. 23) and applies ON voltage to each scanning line 5 sequentially so as to perform reading processing of image data D.

Hereinafter, the scanning line 5 (that is, the line 5 which is the scanning line 5 in a case of FIG. 19, the line Ln+1 which is the scanning line 5 in a case of FIG. 23) to which ON voltage is applied first in reading processing of image data D is called a reading start line. That is, in the embodiment, in reading processing of image data D, the control unit 22 starts applying ON voltage from the scanning line 5 (that is, the reading start line) which is next to the detection line to perform reading processing of image data D.

Also, in the embodiment, in reading processing of image data D, ON voltage is applied to each scanning line 5 sequentially so that the cycle in which ON voltage is applied from the gate driver 15b to each scanning line 5 be the same as the cycle τ in reset processing (in a case of the detection technique 1. see FIG. 19, for example) of each radiation detection element 7 which is performed alternatively with reading processing of leak data dleak before radiation image capturing or in reading processing (in a case of the detection technique 2. see FIG. 23) of image data d for detecting radiation irradiation start.

Such configuration is preferable because each of the scanning line 5 has the same time Tac (see FIGS. 19 and 23. Hereinafter, called an effective accumulation time Tac) after ON voltage applied to the scanning lines 5 before switching to electric charge accumulating state is switched to OFF voltage till when ON voltage applied to the scanning line 5 in reading processing of image data D is switched to OFF voltage via the electric charge accumulating state.

[Processing after Reading Processing of Image Data]

In the embodiment, the control unit 22 of the radiation image capturing apparatus 1 performs radiation image capturing in the cooperation method or in the non-cooperation method and sends the thinned data Dt which is created by thinning the image data D at a predetermined rate to the console 58 as data for preview image after ending the reading processing of image data D as mentioned above.

As for the thinned data Dt, as shown in FIG. 25 for example, if image data D read out from the radiation detection element 7(n, m) which is in the line n and the row m of the detection part P (see FIGS. 4 and 7) of the radiation image capturing apparatus 1 is indicated by D (n, m), as shown in the shaded area in the drawings for example, it can be configured so as to create thinned data Dt by extracting each image data D (n, m) which is read out from the radiation detection element 7 connected to the scanning line 5 which is specified at a rate of one out of every predetermined number lines L1 to Lx which are the scanning lines 5 (at a rate of one out of every four lines in a case of FIG. 25).

It can also be configured so as to create the thinned data Dt in other ways such as by extracting image data D at a rate of one out of every 3×3 pixels or 4×4 pixels, for example.

Further, as mentioned above, the console 58 generates a preview image I_pre (not shown in the drawings) based on the thinned data Dt and displays the image on the display part 58a when the thinned data Dt as data for preview image is sent from the radiation image capturing apparatus 1.

Then, a radiation technologist or such like looks at the preview image I_pre to judge whether the image capturing was performed appropriately, whether another image capturing is needed and the like. When the radiation technologist or the like judges that another image capturing is needed, radiation image capturing is restarted from the beginning.

On the other hand, as shown in FIGS. 19 and 23, in the electric charge accumulating state, electric charges generated in each radiation detection element 7 are accumulated in the radiation detection element 7 because each TFT 8 is in an OFF state. At that time, inside each radiation detection element 7, so-called dark electric charges are always generated due to thermal excitation and the like by heat (temperature) of each radiation detection element 7 itself, and the dark electric charges are also accumulated in each radiation detection element 7.

Then, as well as useful data caused by electric charges generated in each radiation detection element 7 by radiation irradiation, data equivalent to offset caused by the dark electric charges is included in the image data D read out in the reading processing.

Therefore, in the embodiment, after or in parallel with sending of the above data for preview image, the control unit 22 of the radiation image capturing apparatus 1 carries out reading processing of offset data O for reading out data equivalent to offset caused by the above dark electric charges included in the image data D as offset data O. It can also be configured so that reading processing of offset data O is performed before radiation image capturing.

In the embodiment, as for reading processing of offset data O, processing sequence which is same as the series of processing shown in FIG. 15 (in a case of the cooperation method), FIG. 19 (in a case where the detection technique 1 is adopted) and FIG. 23 (in a case where the detection technique 2 is adopted) is repeated to perform reading processing of offset data O. At that time, radiation irradiation of the radiation image capturing apparatus 1 is not performed.

Then, when reading processing of offset data O is ended, in the embodiment, the control unit 22 of the radiation image capturing apparatus 1 sends each of the above-mentioned offset data O corresponding to the thinned data Dt as data for preview image (that is, offset data O corresponding to each image data D which is indicated by being shaded in FIG. 25, for example), the remaining image data D and the remaining offset data O to the console 58.

Then, when the remaining image data D and the like are sent from the radiation image capturing apparatus 1, as mentioned above, the console 58 restores the original entire image data D from the thinned data Dt and the remaining image data D, subtracts offset data O from the image data D for each radiation detection element 7 according to the following formula I and calculates so-called real image data D.

$$D^* = D - O \qquad (1)$$

Because the offset data O is data equivalent to offset caused by dark electric charges included in the image data D as mentioned above, the real image data D* obtained by subtracting the offset data O from the image data D becomes data which supports information of the target body caused only by electric charges generated in the radiation detection element 7 by radiation irradiation.

Then, the console 58 carries out accurate image processing such as gain correction and defect pixel correction, tone processing corresponding to the radiation image captured part on the real image data D* calculated for each radiation detection element 7 and generates final radiation image I.

[Problems of Standby Time]

Incidentally, in the radiation image capturing system 50 in the above configuration, as mentioned above, there is a problem of standby time until the radiation source 52 is allowed to actually emit radiation onto the radiation image capturing apparatus 1 after it becomes possible for the radiation image capturing apparatus 1 to perform radiation image capturing by switching power consumption mode of the radiation image capturing apparatus 1 from the sleep mode to the image capturing mode or by turning on the radiation image capturing apparatus 1.

Hereinafter, processing immediately after power consumption mode in the radiation image capturing apparatus 1 or power ON/OFF is switched including how to set the standby time and the like will be described. In addition, operation of the radiation image capturing system 50 and the radiation image capturing apparatus 1 according to the embodiment will be described together.

[How to Set Standby Time]

[Case in the Cooperation Method]

As mentioned above, conventionally, there is a case where radiation is not emitted from the radiation source 52 to the radiation image capturing apparatus 1 (see FIG. 11, for example) immediately after switching when power consumption mode of the radiation image capturing apparatus 1 is switched from the sleep mode to the image capturing mode or the power is turned on in a case of the radiation image capturing apparatus 1 which performs radiation image capturing in the cooperation method.

Figure 26:
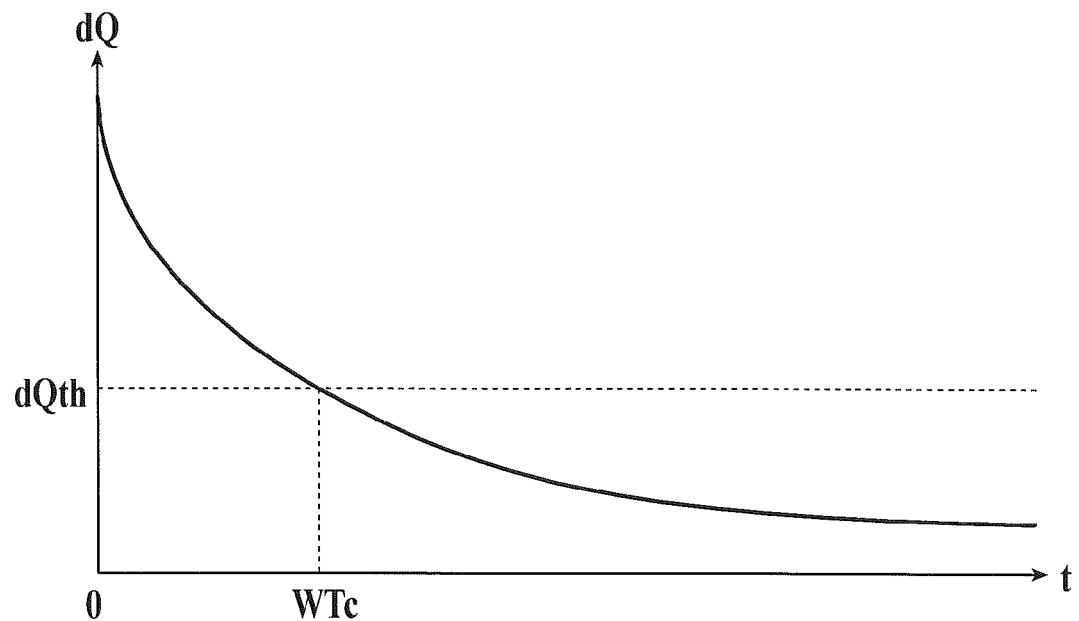
FIG. 26 is a graph showing a relationship between an elapsed time t from the time when power consumption mode is switched from a sleep mode to an image capturing mode or from the time when the power is turned on and an electric charge amount dQ per unit time which is generated in each radiation detection element.

As shown in FIG. 26, this is because the electric charge amount dQ per unit time generated in each radiation detection element 7 is large immediately after the sleep mode is switched to the image capturing mode or power is turned on (the time 0 in the drawings) and when reading processing of the image data D is performed at that time, there may be excessive amount of electric charges which are other than the electric charges generated by radiation irradiation and which are accumulated in each radiation detection element 7 during the above electric charge accumulating state (see FIG. 15).

For example, when image data D is read out by performing radiation image capturing in this state, the offset corresponding to the above electric charge amount dQ included in the image data D becomes larger, and therefore the S/N ratio of the image data D becomes worse. Then, when radiation image I is generated based on such image data D, relatively large noise is superimposed on the generated radiation image I and image quality of the radiation image I becomes degraded.

FIG. 26 is a graph showing a relationship between elapsed time t from the time (time 0) when the sleep mode is switched to the image capturing mode or when the power is turned on and electric charge amount dQ per unit time which is generated in each radiation detection element 7. Also, the electric charge amount dQ per unit time which is generated in each radiation detection element 7 decreases as time t elapses, and settles down at a value equivalent to the amount of the above-mentioned dark electric charges which are generated.

Then, in order to prevent the above situation and keep the S/N ratio and the like of image data D within the permissible range, as shown in FIG. 26, a threshold value dQth is set with respect to the electric charge amount dQ per unit time generated in each radiation detection element 7. Then, it is configured so that radiation is not emitted from the radiation source 52 (see FIG. 11 and the like) to the radiation image capturing apparatus 1 after the sleep mode is switched to the image capturing mode and the like until the electric charge amount dQ per unit time generated in each radiation detection element 7 decreases to be equal to or smaller than the threshold value dQth.

This standby time WT until electric charge amount dQ per unit time generated in each radiation detection element 7 decreases to the threshold value dQth is the above-mentioned standby time.

Here, the standby time WT in this case is indicated by standby time WTc which means the standby time in the cooperation method. Then, after the standby time WTc elapses, at least electric charge amount dQ per unit time generated in each radiation detection element 7 is sufficiently small and it is possible to suppress the degradation of S/N ratio of image data due to the electric charges so as to be within the permissible range.

Incidentally, the above standby time WTc in the cooperation method is not necessarily set as one standby time WTc. That is, in a case where the power consumption mode of the radiation image capturing apparatus 1 is switched from the sleep mode to the image capturing mode, the reset processing (see FIG. 13 and the like) of each radiation detection element 7 is promptly started in the radiation image capturing apparatus 1 as described above.

In contrary to this, in a case where the power is turned on and radiation image capturing can be carried out by the radiation image capturing apparatus 1, before starting the reset processing of each radiation detection element 7, processing such as activating the scan activation unit 15, each reading circuit 17, bias power source 14 (see FIG. 7) and the like need to be carried out. Also, there may be a configuration in which reset processing and the like of each radiation detection element 7 shown in FIG. 13 is performed for a predetermined time period after activating the above parts.

Therefore, even in cases where radiation image capturing is performed in the same cooperation method, the above standby time WTc is usually different between a case where the sleep mode is switched to the image capturing mode and a case where the power is turned on. Then, standby time WTc is previously set for each radiation image capturing apparatus 1 at the time of shipment from a factory, introduction to facilities and the like, and usually set as a fixed time WTc. A configuration may be such that the standby time WTc is set again at the time of maintenance and the like of the radiation image capturing apparatus 1.

[Case in the Non-Cooperation Method]

On the other hand, the studies by the inventors have revealed that a negative effect can occur if the standby time WTc in a case of the above cooperation method is used when radiation image capturing is performed in the non-cooperation method, that is, when radiation image capturing is performed by using the above detection techniques 1 and 2.

Here, in a case where radiation image capturing is performed in the non-cooperation method, suppose that the radiation source 52 emits radiation onto the radiation image capturing apparatus 1 to perform radiation image capturing when or immediately after the standby time WTc in a case of the cooperation method elapses after power consumption mode of the radiation image capturing apparatus 1 is switched to the image capturing mode or power is turned on.

Figure 27:
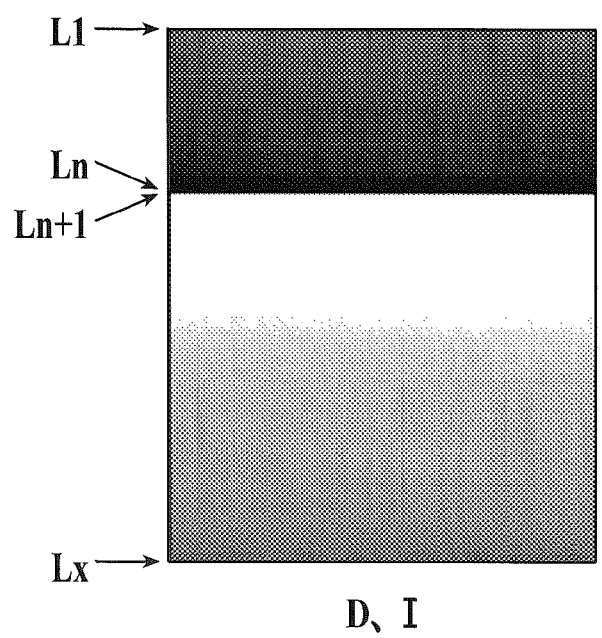
FIG. 27 is a diagram explaining drastic difference in brightness which occurs in image data D and radiation image I when radiation image capturing is performed in the non-cooperation method.

Then, as shown in FIG. 27, it was found that drastic difference in brightness may occur between the above detection line (see Ln in the drawing) and the reading start line (see Ln+1 in the drawing) in the read out image data D and the radiation image I generated based thereon. Though difference in brightness is shown by shading (brighter one has a larger value of image data D and the like) and difference in brightness is overly expressed in FIG. 27 and after-mentioned FIG. 29, the difference and drastic difference in brightness are actually minimal.

The cause of such phenomenon is considered as following. That is, suppose that the radiation image capturing apparatus 1 is irradiated with radiation at some point in the standby time WTc in FIG. 26, for example. In addition, suppose that the detection line is the line Ln which is the scanning line 5 at that time, for example. Then, the radiation image capturing apparatus 1 switches to electric charge accumulating state from the point in the time WTc, and therefore TFT 8 is to be in an OFF state from the point in the time WTc in the detection line Ln.

Figure 28A:
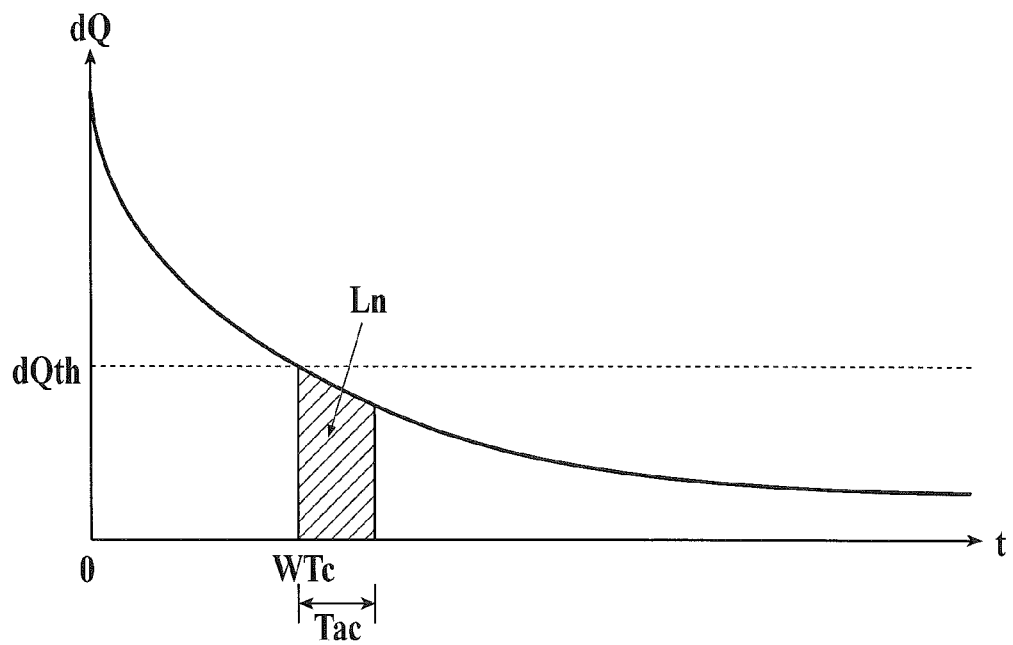
FIG. 28A is a graph showing electric charges and the like which are accumulated in each radiation detection element which is connected to a detection line.

Then, as shown in FIGS. 19 and 23, in the detection line Ln (detection line L4 in FIG. 19), the state where the TFT 8 is in an OFF state continues during the effective accumulation time Tac until reading processing of image data D is performed thereafter. Therefore, in the detection line Ln, as shown in FIG. 28A, TFT 8 is in an OFF state during effective accumulation time Tac from the standby time WTc, and meanwhile, electric charges Q (that is, integrated value of the above electric charge amount dQ generated per unit time) equivalent to the shaded area in the drawings are accumulated in each radiation detection element 7 as electric charges Q equivalent to the offset superimposed in image data D.

On the other hand, though not shown in FIGS. 19 and 23, ON voltage is applied to the reading start line Ln+1 (the detection line L5 in FIG. 19) *before* ON voltage is applied to the detection line Ln (the detection line L4 in FIG. 19), and the effective accumulation time Tac starts to elapse earlier.

Figure 28B:
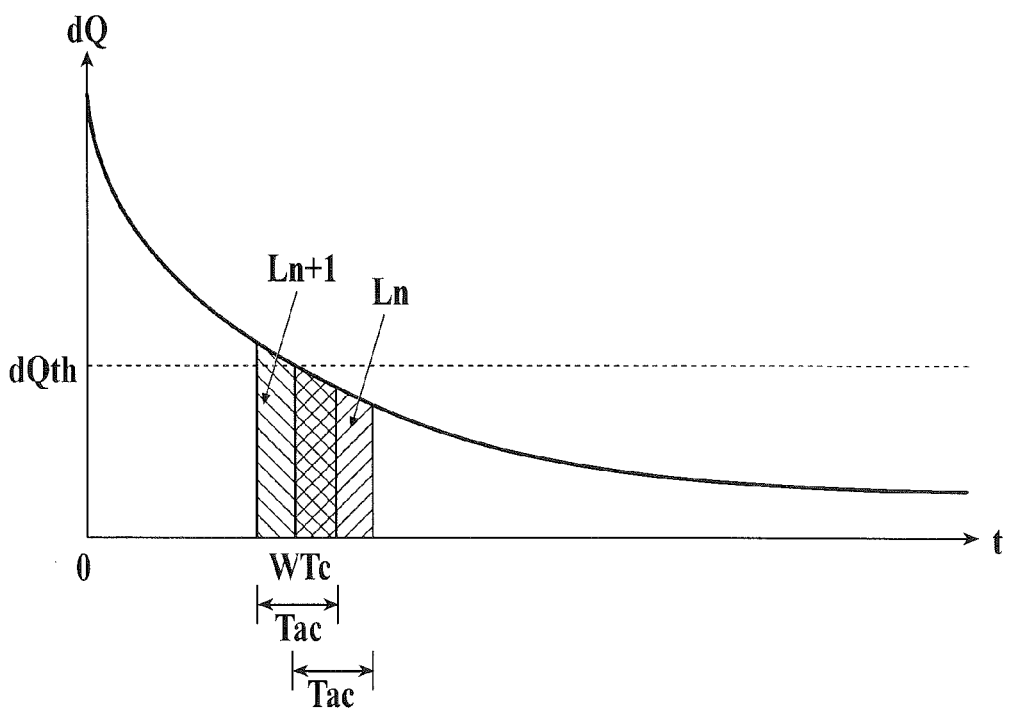
FIG. 28B is a graph showing electric charges and the like which are accumulated in each radiation detection element connected to a detection line and a reading start line.

Therefore, in the reading start line Ln+1, as shown in FIG. 28B, the effective accumulation time Tac starts earlier than in the detection line Ln, the effective accumulation time Tac ends earlier than in the detection line Ln and reading processing of image data D is performed.

As mentioned above, in the embodiment, the effective accumulation time Tac of the detection line Ln and the effective accumulation time Tac of the reading start line Ln+1 are to be the same time. In addition, the time in which the effective accumulation time Tac of the reading start line Ln+1 and the effective accumulation time Tac of the detection line Ln overlap in FIG. 28B is equivalent to duration time of the above electric charge accumulating state.

In the above case, as shown in FIG. 28B, each radiation detection element 7 connected to the reading start line Ln+1 has more electric charges Q accumulated therein, that is, more the electric charges Q equivalent to offset superimposed on the image data D than electric charges Q of each radiation detection element 7 connected to the detection line Ln.

Therefore, even in a case where the radiation image capturing apparatus 1 is uniformly irradiated with radiation without target body for example, each radiation detection element 7 connected to the reading start line Ln+1 has larger read out image data D than the image data D of each radiation detection element 7 connected to the detection line Ln.

As mentioned above, though the radiation image I is generated based on the real image data D* obtained by subtracting the offset data O from the image data D according to the above formula (I), the offset data O is read out long after the standby time WTc in FIG. 28B and at that time, the difference in offset due to electric charges Q superimposed on the offset data O is very small between the reading start line Ln+1 and the detection line Ln.

Therefore, because influence of offset due to electric charges Q superimposed on the image data D strongly remains in the real image data D*, drastic difference in brightness can also occur between the detection line Ln and the reading start line Ln+1 in the radiation image I generated based on the real image data D*.

Further, in a case where radiation image capturing is performed in the cooperation method, difference in brightness also occurs between the reading start line Ln+1 and the detection line Ln actually. Because detection processing of radiation irradiation start is not performed in the cooperation method, "detection line Ln" in this case means a scanning line 5 which is adjacent to the reading start line Ln+1 in its upper side.

However, in the cooperation method, as shown in FIG. 15, reading processing of the image data D is performed by applying ON voltage starting from the first line L1 (the line corresponding to the above reading start line Ln+1) which is the scanning line 5 to the last line Lx (the line corresponding to the above "detection line Ln") which is the scanning line 5 sequentially.

Figure 29:
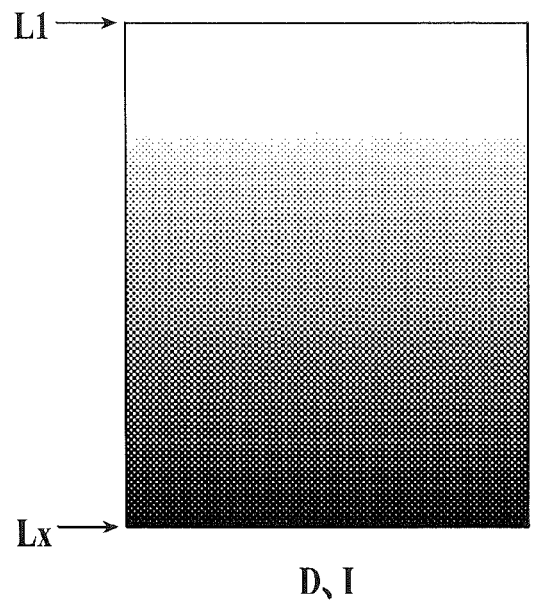
FIG. 29 is a diagram explaining that drastic difference in brightness does not appear in image data D and radiation image I in a case of the cooperation method.

Therefore, brightness of each image data D for each of the lines L1 to Lx which are the scanning lines 5 and brightness of the part corresponding to each of the lines L1 to Lx which are the scanning lines 5 in the radiation image I generated based on the image data D change in a gradation manner as shown in FIG. 29 and at least drastic difference in brightness does not appear in the image data D and the radiation image I. Therefore, the standby time WTc in the cooperation method may remain to be the above standby time WTc.

As described above, if this standby time WTc in the cooperation method is applied as it is in a case where radiation image capturing is performed in the non-cooperation method, as shown in FIGS. 27 and 28B, drastic difference in brightness occurs in the image data D or the radiation image I.

Then, in the embodiment, in a case where radiation image capturing is performed in the non-cooperation method, standby time WTnc which is different from the standby time WTc of the cooperation method is set as standby time until the radiation source 52 is allowed to emit radiation onto the radiation image capturing apparatus 1 after it becomes possible for the radiation image capturing apparatus to perform radiation image capturing by switching the power consumption mode of the radiation image capturing apparatus 1 to the image capturing mode or turning on the power.

Then, in the embodiment, as described above, the radiation image capturing apparatus 1 is configured so as to perform radiation image capturing in both of the cooperation method and the non-cooperation method, and in that case, when the image capturing method is switched between the cooperation method and the non-cooperation method, the standby time is applied by being switched between the standby time WTc in the cooperation method and the standby time WTnc in the non-cooperation method.

The standby time WTnc in the non-cooperation method is obtained similarly as in the above case shown in FIG. 28B. That is, after power consumption mode of the radiation image capturing apparatus 1 is switched to the image capturing mode or power is turned on (time 0), the time t is variously changed and the radiation image capturing apparatus 1 is irradiated with radiation.

Figure 30:
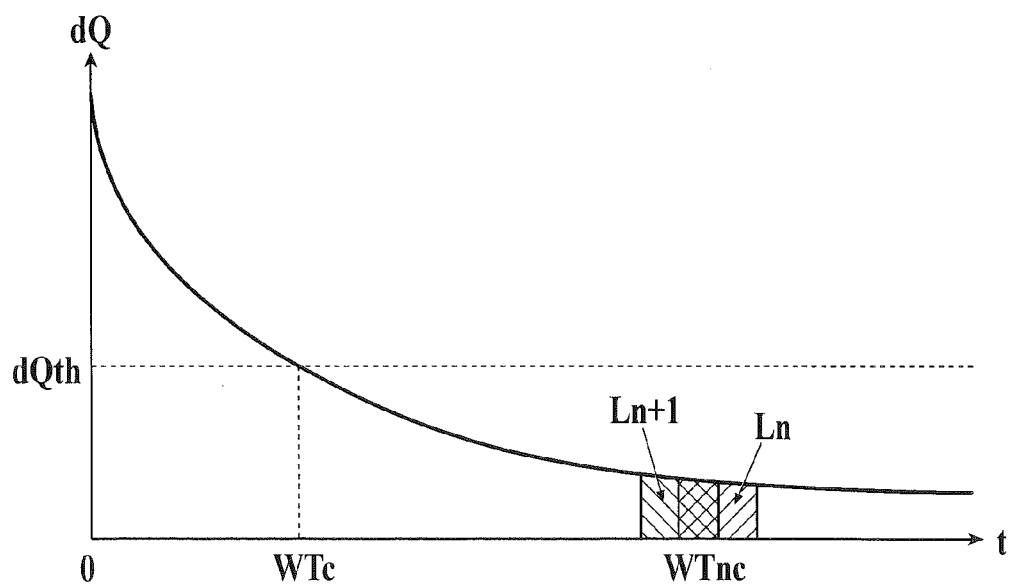
FIG. 30 is a graph explaining that the shortest time which is within the permissible range of difference in brightness of image data D between a reading start line and a detection line is set as standby time in the non-cooperation method.

Then, as shown in FIG. 30, among the time which allow the difference in brightness of the image data D be within the range of permissible difference between the reading start line Ln+1 and the detection line Ln, the shortest time is set as the standby time WTnc in the non-cooperation method. In the non-cooperation method, if radiation irradiation is performed after the standby time WTnc elapses, the difference in brightness of the image data D is kept within the range of permissible difference between the reading start line Ln+1 and the detection line Ln and the drastic difference in brightness is hardly confirmed visually in the radiation image I generated based on the image data D.

Also in this case, the standby time WTnc is different between in a case where the sleep mode is switched to the image capturing mode and in a case where the power is turned on.

[Processing Immediately after Switching the Power Consumption Mode or On/Off of the Power]

In the embodiment, as mentioned above, the console 58 manages the state of power consumption mode (that is, whether it is the image capturing mode or the sleep mode) and the state of ON/OFF of the power for each of the one or a plurality of radiation image capturing apparatuses 1 to be managed.

In addition, in the embodiment, the console 58 manages information on standby time WTc in a case of the cooperation method and information on standby time WTnc in a case of the non-cooperation method for each radiation image capturing apparatus 1. In the embodiment, the standby time WTc and WTnc respectively in a case of the cooperation method and the non-cooperation method are previously set at the time of shipment from a factory, introduction to a facility and the like, or previously set in the console 58 as a fixed time which is to be set again at the time of maintenance of the radiation image capturing apparatus 1 and the like.

Then, when the radiation image capturing apparatus 1 used in radiation image capturing and the image capturing method (that is, whether to perform in the cooperation method or to perform in the non-cooperation method) of radiation image capturing are clarified, the console 58 reads out the standby time WTc or the standby time WTnc corresponding to the radiation image capturing apparatus 1 and the image capturing method from the storage unit 59.

Then, count of elapsed time t is started from the time when a signal is sent, the signal indicating the switching to the image capturing mode was performed by switching the power consumption mode of the radiation image capturing apparatus 1 from the sleep mode to the image capturing mode by sending a wake up signal to the radiation image capturing apparatus 1, by a radiation technologist operating the alternation switch 38 (see FIG. 1) of the radiation image capturing apparatus 1 or the like.

Also, when a signal indicating that a radiation technologist operated the power switch 37 and the power is turned on is sent from the radiation image capturing apparatus 1, the console 58 judges that the radiation image capturing apparatus 1 is to be used in radiation image capturing and reads out standby time WTc or standby time WTnc corresponding to the radiation image capturing apparatus 1 and the image capturing method from the storage unit 59. Then, the console 58 starts to count the elapsed time t from the time when the signal is sent.

Then, in the embodiment, in both of the above cases, the console 58 displays a warning to a radiation technologist not to perform radiation irradiation on the display part 58a (see FIGS. 11 and 12) at the same time when starting to count the elapsed time t. This is because the image quality of the radiation image I can be degraded and drastic difference in brightness can appear in the radiation image I as mentioned above when the radiation image capturing apparatus 1 is irradiated with radiation before the elapsed time t fulfills standby time WTc or WTnc, and the warning is for preventing the problems.

Then, when the elapsed time t reaches standby time WTc or WTnc, the console 58 switches the display on the display part 58a from the above warning display to the normal display. The radiation technologist confirms the switching of the display, and thereafter operates the exposure switch 56 to emit radiation from the radiation source 52.

Also, in a case where radiation is emitted from the radiation source 52 before the elapsed time t reaches standby time WTc or WTnc, as mentioned above, the image quality of the radiation image I can be degraded and drastic difference in brightness can appear in the radiation image I.

Thus, in the embodiment, in order to inform a radiation technologist of the problems, in a case where the radiation source 52 emits radiation onto the radiation image capturing apparatus 1 during the above standby time WTc or WTnc, the console 58 displays the warning indicating that image quality can be degraded when displaying the preview image I_pre which is generated based on data for preview image (that is, thinned data Dt) sent from the radiation image capturing apparatus 1 on the display part 58a, for example.

In such configuration, as mentioned above, when a radiation technologist judges necessity of another image capturing by looking at the preview image I_pre, it is possible to judge necessity of another image capturing with recognition that image quality can be degraded by having drastic difference in brightness or such like because radiation irradiation is performed too early.

[Variation 1]

In the above embodiment, a case where each of standby time WTc in the cooperation method and standby time WTnc in the non-cooperation method is previously set in the console 58 as a fixed time is explained. However, at least in a case of radiation image capturing in the non-cooperation method, the configuration can be such that the value of read out leak data dleak and the value of image data d for detecting radiation irradiation start are analyzed by the control unit 22 of the radiation image capturing apparatus 1 and the standby time WTnc can be changed on the basis of the analyzed result.

In this case, the console 58 displays the warning to a radiation technologist not to perform radiation irradiation on the display part 58a and prohibits radiation irradiation. Then, when information on standby time WTnc which is changed is sent from the radiation image capturing apparatus 1 to be notified, the console 58 sets the information as standby time WTnc in radiation image capturing in the non-cooperation method of this time. Then, it is configured so that until the elapsed time t reaches the changed standby time WTc or WTnc, the above warning is displayed on the display part 58a.

[Variation 2]

In addition, at least in a case where radiation image capturing is performed in the non-cooperation method, the configuration can also be such that the control unit 22 of the radiation image capturing apparatus analyzes the value of read out leak data dleak or the value of image data d for detecting radiation irradiation start, calculates a derivative value of the leak data dleak or the image data d for detecting radiation irradiation start, for example and detects that the derivative value becomes equal to or less than the predetermined threshold value.

That is, the configuration can be such that as for judging processing of whether difference in brightness of image data D between the reading start line Ln+1 and the detection line Ln is within the range of permissible difference which is shown in FIG. 30, the radiation image capturing apparatus 1 can make the judgment by itself on the basis of the derivative value of the read out leak data dleak or image data d for detecting radiation irradiation start.

In this case, it is configured so that the control unit 22 of the radiation image capturing apparatus 1 sends a signal allowing radiation irradiation to the console 58 at the time when the derivative value of leak data dleak or image data d for detecting radiation irradiation start becomes equal to or less than the predetermined threshold value.

Then, at the time when power consumption mode of the radiation image capturing apparatus 1 is switched from the sleep mode to the image capturing mode (or at the time when the radiation image capturing apparatus 1 is turned on in a case where this method is applied in the cooperation method), the console 58 displays a warning not to perform radiation irradiation on the display part 58a. Then, it is configured so that the above display continues until the above signal is sent from the radiation image capturing apparatus 1.

In this way, in a case where the variation 2 is adopted, at least standby time WTnc in a case where radiation image capturing is performed in the non-cooperation method is not previously set on the console 58. However, as described above, sending of the signal allowing radiation irradiation from the radiation image capturing apparatus 1 to the console 58 can be assumed as setting of the standby time WTnc with respect to the console 58.

In the variation 2, as described above, the configuration can be such that the control unit 22 of the radiation image capturing apparatus 1 performs display indicating that radiation irradiation is allowed by lighting the display unit of the radiation image capturing apparatus 1 itself such as the indicator 40 (see FIG. 1), for example, in a predetermined way and such like instead of or in parallel with sending the signal allowing radiation irradiation to the console 58 at the time when the derivative value of leak data dleak or image data d for detecting radiation irradiation start becomes equal to or less than the predetermined threshold value.

In such configuration, a radiation technologist can recognize that it becomes possible to perform radiation irradiation by looking at the display on the display unit of the radiation image capturing apparatus 1. Then, if radiation irradiation is performed after the display on the display unit, it is possible to accurately prevent the drastic difference in brightness in the image data D and in the radiation image I generated based on the image data D.

As described above, according to the radiation image capturing system 50 and the radiation image capturing apparatus 1 according to the embodiment, the console 58 switches standby time WTc and WTnc between in a case of the cooperation method and in a case of the non-cooperation method, the standby time WTc and WTnc being the time until the radiation source 52 is allowed to emit radiation onto the radiation image capturing apparatus 1 after it becomes possible for the radiation image capturing apparatus 1 to perform radiation image capturing by switching power consumption mode of the radiation image capturing apparatus 1 to the image capturing mode, turning on the power and such like.

Therefore, in a case of using a radiation image capturing apparatus 1 configured so as to perform radiation image capturing in both of the cooperation method and the non-cooperation method, the standby time WTc in the cooperation method is accurately applied when radiation image capturing is performed in the cooperation method and the standby time WTnc in the non-cooperation method is accurately applied when radiation image capturing is performed in the non-cooperation method.

Therefore, it is possible to accurately prevent standby time WTc in the cooperation method which is shorter than standby time WTnc in the non-cooperation method from being applied to the case where radiation image capturing is performed in the non-cooperation method causing drastic difference in brightness in the read out image data D and the radiation image I generated based on the image data D.

Further, it is possible to accurately prevent standby time WTnc in the non-cooperation method which is longer than standby time WTc in the cooperation method from being applied to the case where radiation image capturing is performed in the cooperation method and putting a radiation technologist on standby longer than necessary until radiation irradiation is performed. Therefore, the radiation image capturing system 50 and the radiation image capturing apparatus 1 can be conveniently used by a radiation technologist.

The configuration can be such that start of radiation irradiation is detected more accurately by further improving the above detection techniques 1 and 2 in the non-cooperation method in the embodiment, and such improvement is performed appropriately.

Also, in the embodiment, as mentioned above, the configuration where thinned data Dt which is data for preview image is sent after reading processing of image data D is explained, however, the configuration can be such that entire image data D instead of thinned data Dt is sent, for example.

Further, the configuration can also be such that data for preview image is not sent after reading processing of image data D and that all the image data D and offset data O are sent at the time when reading processing of offset data O thereafter is ended. In this case, it is configured so that in a case where the warning indicating that image quality can be worse is displayed, the warning is displayed when the generated radiation image I is displayed on the display part 58a.

In such way, it can be appropriately determined how to send image data D and the like from the radiation image capturing apparatus 1 to the console 58.

Also, it goes without saying that the present invention is not limited to the above embodiment and can be changed appropriately as long as the change is within the scope of the invention.

The entire disclosure of Japanese Patent Application No. 2011-218892 filed on Oct. 3, 2011 including description, claims, drawings, and abstract are incorporated herein by reference in its entirety.

What is claimed is:

1. A radiation image capturing system, comprising:
a radiation image capturing apparatus, comprising:
    a detection part comprising a plurality of scanning lines and a plurality of signal lines which are disposed so as to intersect each other and a plurality of radiation detection elements which are two dimensionally arranged by providing each of the radiation detection elements in each of small regions defined by the plurality of scanning lines and the plurality of signal lines;
    a scan activation unit which switches voltage to be applied to each of the scanning lines between ON voltage and OFF voltage;
    switch units which are respectively connected to the scanning lines and release electric charges accumulated in the radiation detection elements to the signal lines when ON voltage is applied;
    a reading circuit in which the electric charges released from the radiation detection elements are converted into image data and read out;
    a control unit which controls at least the scan activation unit and the reading circuit to perform reading processing of the image data from the radiation detection elements; and
    a communication unit for performing sending and receiving of signals and sending of the image data to an external apparatus;
a radiation generation apparatus comprising a radiation source which emits radiation onto the radiation image capturing apparatus; and
a console which communicates with the radiation image capturing apparatus; wherein
the radiation image capturing apparatus switches an image capturing method between a cooperation method in which radiation image capturing is performed in cooperation with the radiation generation apparatus and a non-cooperation method in which radiation image capturing is performed without cooperation with the radiation generation apparatus, and
the console switches standby time which is a time period after the radiation image capturing apparatus becomes able to perform radiation image capturing until the radiation source is allowed to emit the radiation onto the radiation image capturing apparatus between the cooperation method and the non-cooperation method.

2. The radiation image capturing system according to claim 1, wherein, when the radiation image capturing is to be performed in the non-cooperation method, before the radiation image capturing is performed, the control unit of the radiation image capturing apparatus performs reading processing of leak data in which the electric charges leaked from each of the radiation detection elements via each of the switch units in a state where each of the switch units is turned off by applying OFF voltage from the scan activation unit to each of the scanning lines are converted into leak data, and detects that radiation irradiation is started when the read out leak data exceeds a threshold value.

3. The radiation image capturing system according to claim 2, wherein the control unit of the radiation image capturing apparatus analyzes a value of the leak data which is read out, and changes the standby time at least in a case of the non-cooperation method.

4. The radiation image capturing system according to claim 3, wherein the control unit of the radiation image capturing apparatus sends the changed standby time to the console to notify when the standby time is changed.

5. The radiation image capturing system according to claim 1, wherein, when the radiation image capturing is performed in the non-cooperation method, before the radiation image capturing is performed, the control unit of the radiation image capturing apparatus performs reading processing of image data for detecting radiation irradiation start by applying ON voltage from the scan activation unit to each of the scanning lines sequentially, and detects that radiation irradiation is started when the read out image data for detecting the radiation irradiation start exceeds a threshold value.

6. The radiation image capturing system according to claim 5, wherein the control unit of the radiation image capturing apparatus analyzes a value of the image data for detecting radiation irradiation start which is read out, and changes the standby time at least in a case of the non-cooperation method.

7. The radiation image capturing system according to claim 6, wherein the control unit of the radiation image capturing apparatus sends the changed standby time to the console to notify when the standby time is changed.

8. The radiation image capturing system according to claim 1, wherein each of the standby time in the cooperation method and the standby time in the non-cooperation method is set as a fixed time.

9. The radiation image capturing system according to claim 1, wherein
the radiation image capturing apparatus switches a power consumption mode between an image capturing mode in which electric power is supplied at least to the scan activation unit and the reading circuit and radiation image capturing is to be performed and a sleep mode in which electric power is supplied only to a necessary function part and radiation image capturing is not performed, and
the standby time is set as a time period after the power consumption mode of the radiation image capturing apparatus is switched from the sleep mode to the image capturing mode until the radiation source is allowed to emit the radiation onto the radiation image capturing apparatus.

10. The radiation image capturing system according to claim 9, wherein the console switches the power consumption mode of the radiation image capturing apparatus at least from the sleep mode to the image capturing mode.

11. The radiation image capturing system according to claim 1, wherein the standby time is set as a time period after the radiation image capturing apparatus is turned on until the radiation source is allowed to emit the radiation onto the radiation image capturing apparatus.

12. The radiation image capturing system according to claim 1, further comprising a plurality of the radiation image capturing apparatuses, wherein
the standby time is set for each of the radiation image capturing apparatuses.

13. The radiation image capturing system according to claim 1, wherein the console comprises a display part and displays a warning not to perform radiation irradiation on the display part after the radiation image capturing apparatus becomes able to perform the radiation image capturing until the standby time elapses.

14. The radiation image capturing system according to claim 1, wherein the console comprises a display part and, when the radiation source emits the radiation onto the radiation image capturing apparatus during the standby time, displays a warning indicating a possibility of worsening in image quality when an image generated based on data sent from the radiation image capturing apparatus is displayed on the display part.

15. A radiation image capturing apparatus, comprising:
a detection part comprising a plurality of scanning lines and a plurality of signal lines which are disposed so as to intersect each other and a plurality of radiation detection elements which are two dimensionally arranged by providing each of the radiation detection elements in each of small regions defined by the plurality of scanning lines and the plurality of signal lines;
a scan activation unit which switches voltage to be applied to each of the scanning lines between ON voltage and OFF voltage;
switch units which are respectively connected to the scanning lines and release electric charges accumulated in the radiation detection elements to the signal lines when ON voltage is applied;
a reading circuit in which the electric charges released from the radiation detection elements are converted into image data and read out;
a control unit which controls at least the scan activation unit and the reading circuit to perform reading processing of the image data from the radiation detection elements; and
a communication unit for performing sending and receiving of signals and sending of the image data to a console; wherein
the control unit analyzes a value of leak data or a value of image data for detecting radiation irradiation start which are read out, and sends a signal for allowing radiation irradiation to the console when a derivative value of the leak data or a derivative value of the image data for detecting radiation irradiation start becomes equal to or less than a predetermined threshold value.

16. The radiation image capturing apparatus according to claim 15, wherein the control unit performs display for allowing radiation irradiation on a display unit of the apparatus instead of or in parallel with sending a signal for allowing radiation irradiation to the console.

* * * * *